United States Patent
Lee et al.

(10) Patent No.: US 10,296,065 B2
(45) Date of Patent: May 21, 2019

(54) CLOCK MANAGEMENT USING FULL HANDSHAKING

(71) Applicant: SAMSUNG ELECTRONICS CO., LTD., Suwon-si, Gyeonggi-Do (KR)

(72) Inventors: Jae Gon Lee, Yongin-si (KR); Ah Chan Kim, Hwaseong-si (KR); Jin Ook Song, Seoul (KR); Jae Young Lee, Hwaseong-si (KR); Youn Sik Choi, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 80 days.

(21) Appl. No.: 15/414,969

(22) Filed: Jan. 25, 2017

(65) Prior Publication Data

US 2017/0212576 A1    Jul. 27, 2017

Related U.S. Application Data

(60) Provisional application No. 62/286,860, filed on Jan. 25, 2016, provisional application No. 62/286,873, filed on Jan. 25, 2016.

(30) Foreign Application Priority Data

Jan. 24, 2017  (KR) .................. 10-2017-0010943
Jan. 24, 2017  (KR) .................. 10-2017-0010945

(51) Int. Cl.
*G06F 1/00* (2006.01)
*G06F 1/3234* (2019.01)
(Continued)

(52) U.S. Cl.
CPC .............. *G06F 1/3234* (2013.01); *G06F 1/06* (2013.01); *G06F 13/42* (2013.01); *H04J 3/0658* (2013.01);
(Continued)

(58) Field of Classification Search
None
See application file for complete search history.

(56) References Cited

U.S. PATENT DOCUMENTS 5,373,293 A   12/1994  Hirata
5,600,839 A    2/1997  MacDonald
(Continued)

FOREIGN PATENT DOCUMENTS

JP    11-143570      5/1999
JP    2007-065756    3/2007
(Continued)

OTHER PUBLICATIONS

U.S. OA dated Jul. 5, 2015 for Related U.S. Appl. No. 15/415,041.
(Continued)

*Primary Examiner* — Nitin C Patel
(74) *Attorney, Agent, or Firm* — F. Chau & Associates, LLC

(57) ABSTRACT

A system on chip (SoC) includes a plurality of intellectual property (IP) blocks and a clock management unit (CMU) configured to perform clock gating on at least one of the IP blocks. The IP blocks and the CMU interface with one another using a full handshake method. The full handshake method may include at least one of the IP blocks sending a request signal to the CMU to begin providing a clock signal or to stop providing the clock signal, and the CMU sending an acknowledgement signal to the corresponding IP block in response to receipt of the request signal.

25 Claims, 41 Drawing Sheets

(51) Int. Cl.
  *G06F 13/42*  (2006.01)
  *G06F 1/06*  (2006.01)
  *H04J 3/06*  (2006.01)
  *H04J 3/14*  (2006.01)
  *H04L 12/933*  (2013.01)
(52) U.S. Cl.
  CPC .............. *H04J 3/14* (2013.01); *H04L 49/109* (2013.01); *Y02D 10/14* (2018.01); *Y02D 10/151* (2018.01)

(56) References Cited

U.S. PATENT DOCUMENTS

| | | | |
|---|---|---|---|
| 5,655,127 A | 8/1997 | Rabe et al. | |
| 5,661,751 A * | 8/1997 | Johnson | G06F 1/3215 365/227 |
| 5,793,993 A | 8/1998 | Broedner et al. | |
| 5,978,930 A | 11/1999 | Furuta et al. | |
| 6,021,501 A | 2/2000 | Shay | |
| 6,437,617 B2 | 8/2002 | Saeki | |
| 6,654,898 B1 | 11/2003 | Bailey et al. | |
| 6,822,481 B1 | 11/2004 | Srikantam et al. | |
| 6,889,331 B2 | 5/2005 | Soerensen et al. | |
| 6,915,438 B2 | 7/2005 | Boros | |
| 6,927,604 B2 | 8/2005 | Boerstler et al. | |
| 7,111,183 B1 | 9/2006 | Klein et al. | |
| 7,142,478 B2 | 11/2006 | Suh | |
| 7,162,556 B2 | 1/2007 | Fujiki | |
| 7,174,467 B1 | 2/2007 | Helms et al. | |
| 7,245,161 B2 | 7/2007 | Boerstler et al. | |
| 7,443,218 B2 | 10/2008 | Onouchi et al. | |
| 7,694,042 B2 | 4/2010 | Lee et al. | |
| 7,797,561 B1 | 9/2010 | Abdalla et al. | |
| 7,813,908 B2 | 10/2010 | Yen et al. | |
| 7,971,086 B2 | 6/2011 | Itkin | |
| 8,086,975 B2 | 12/2011 | Shiring et al. | |
| 8,132,144 B2 | 3/2012 | Sundaresan et al. | |
| 8,140,925 B2 | 3/2012 | Bellofatto et al. | |
| 8,289,048 B2 | 10/2012 | Cressman | |
| 8,291,244 B2 | 10/2012 | Tune | |
| 8,375,239 B2 | 2/2013 | Nara et al. | |
| 8,533,648 B2 | 9/2013 | Sundaresan et al. | |
| 8,572,418 B2 | 10/2013 | Singasani | |
| 8,656,196 B2 | 2/2014 | de Cesare et al. | |
| 8,826,047 B1 * | 9/2014 | Zhu | G06F 1/3206 713/300 |
| 8,898,502 B2 | 11/2014 | Maddigan et al. | |
| 8,924,612 B2 | 12/2014 | Maji et al. | |
| 8,996,906 B1 * | 3/2015 | Townley | G06F 1/06 713/600 |
| 9,081,517 B2 | 7/2015 | Koniaris et al. | |
| 9,152,598 B2 | 10/2015 | Fosse et al. | |
| 9,172,377 B2 | 10/2015 | Peng | |
| 9,766,648 B2 | 9/2017 | Hashim et al. | |
| 2002/0152407 A1 | 10/2002 | Aia et al. | |
| 2003/0117176 A1 * | 6/2003 | Tardieux | G06F 1/04 326/93 |
| 2004/0153678 A1 * | 8/2004 | Ahmad | G06F 1/3203 713/322 |
| 2004/0243874 A1 | 12/2004 | Byers et al. | |
| 2005/0232218 A1 | 10/2005 | Edwards et al. | |
| 2006/0161797 A1 | 7/2006 | Grass et al. | |
| 2006/0248367 A1 | 11/2006 | Fischer et al. | |
| 2008/0178024 A1 | 7/2008 | Kamegawa | |
| 2008/0301604 A1 | 12/2008 | Itskovich et al. | |
| 2009/0150706 A1 | 6/2009 | Oh et al. | |
| 2011/0050300 A1 | 3/2011 | Klapproth et al. | |
| 2011/0202788 A1 * | 8/2011 | Hesse | G06F 1/3203 713/600 |
| 2012/0131370 A1 | 5/2012 | Wang et al. | |
| 2013/0055004 A1 | 2/2013 | Koniaris et al. | |
| 2013/0124895 A1 | 5/2013 | Saha et al. | |
| 2013/0173951 A1 | 7/2013 | Vogel | |
| 2014/0082396 A1 | 3/2014 | Vahidsafa et al. | |
| 2014/0089897 A1 | 3/2014 | Kim et al. | |
| 2014/0266333 A1 * | 9/2014 | Jouin | G06F 1/3237 327/142 |
| 2015/0200669 A1 | 7/2015 | Cai et al. | |
| 2015/0373313 A1 | 12/2015 | Kinebuchi et al. | |
| 2016/0094337 A1 | 3/2016 | Choi et al. | |
| 2016/0116934 A1 | 4/2016 | Ha | |
| 2016/0350259 A1 | 12/2016 | Jeon et al. | |

FOREIGN PATENT DOCUMENTS

| | | |
|---|---|---|
| JP | 2008-97594 | 4/2008 |
| JP | 2010-021793 | 1/2010 |
| JP | 5678849 | 3/2015 |
| KR | 1020060064146 | 6/2006 |
| KR | 10-0852885 | 8/2008 |
| KR | 10-1184182 | 9/2012 |
| KR | 1020160038671 | 4/2016 |
| KR | 1020160138786 | 12/2016 |

OTHER PUBLICATIONS

U.S. OA dated Aug. 28, 2018 for Related U.S. Appl. No. 15/414,819.
U.S. OA dated Sep. 17, 2018 for Related U.S. Appl. No. 15/415,162.
U.S. OA dated Oct. 4, 2018 for Related U.S. Appl. No. 15/415,020.

* cited by examiner

CLOCK MANAGEMENT USING FULL HANDSHAKING

CROSS-REFERENCE TO RELATION APPLICATIONS

This application claims the benefit of U.S. Provisional Patent Application No. 62/286,860 filed on Jan. 25, 2016, U.S. Provisional Patent Application No. 62/286,873 filed on Jan. 25, 2016 in the United States Patent and Trademark Office, Korean Patent Application No. 10-2017-0010945 filed on Jan. 24, 2017 in the Korean Intellectual Property Office, and Korean Patent Application No. 10-2017-0010943 filed on Jan. 24, 2017 in the Korean Intellectual Property Office, the disclosures of which are incorporated by reference in their entirety herein.

BACKGROUND

1. Technical Field

The present disclosure relates to a semiconductor device.

2. Discussion of Related Art

With the gradual convergence of computers, communication and broadcasting, the demand for an application specific integrated circuit (ASIC) and an application specific standard product (ASSP) is changing due to the demand for a system-on-chip (SoC). In addition, the trend toward lighter, thinner, more compact and higher-performance information technology (IT) devices is one of the factors that drive the development of SoCs.

An SoC is a single chip onto which functional blocks (e.g., intellectual property (IP) blocks) having various functions are integrated with the help of the development of semiconductor processing technology.

As the integration density, size and operation speed of SoCs increase, power consumption becomes more of a design factor. The temperature of the SoC may increase when it consumes a large amount of power. If the temperature increases too greatly, the SoC may malfunction or become damaged.

Thus, there is a need for an SoC and methods of driving the SoC that can prevent the SoC from consuming too much power.

SUMMARY

According to an exemplary embodiment of the inventive concept, a system on chip (SoC) includes a plurality of intellectual property (IP) blocks and a clock management unit (CMU) configured to perform clock gating on at least one of the IP blocks. The IP blocks and the CMU interface with one another using a full handshake method.

According to an exemplary embodiment of the inventive concept, a clock gating component includes a clock control circuit configured to generate an operating clock signal and a channel management (CM) circuit configured to receive a request signal across a communication channel from an external device, and forward the request signal to the clock control circuit. The clock control circuit is configured to selectively provide the operating clock signal to the external device according to the request signal and provide an acknowledgement (Ack) signal to the CM circuit.

According to an exemplary embodiment of the inventive concept, a clock multiplexer component includes a clock control circuit configured to select one of a first clock signal and a second clock signal based on a first selection signal, generate an operating clock signal based on the selected clock signal, and selectively output the operating clock signal in response to a request signal, and a channel management (CM) circuit configured to receive the request signal across a communication channel from an external device, and forward the request signal to the clock control circuit.

According to an exemplary embodiment of the inventive concept, a clock dividing component includes a clock control circuit configured to perform a dividing operation on an input clock signal to generate a divided clock signal, generate an operating clock signal based on the divided clock signal, and selectively output the operating clock signal to an external device in response to a request signal, and a channel management (CM) circuit configured to receive the request signal across a communication channel from the external device, and forward the request signal to the clock control circuit.

According to an exemplary embodiment of the inventive concept, a method of operating a clock management unit (CMU) includes: the CMU determining whether a request signal received from an intellectual property (IP) block indicates the IP block desires to enter a selected one of an active mode and a sleep mode; the CMU outputting an acknowledgement (Ack) signal at an activated level and a clock signal to the IP block when the request signal indicates the IP block desires to enter the active mode; and the CMU outputting the Ack signal at a deactivated level to the IP block and stopping output of the clock signal to the IP block when the clock request signal indicates the IP block desires to enter the sleep mode.

According to an exemplary embodiment of the inventive concept, a clock management unit (CMU) includes a controller circuit configured to output a first clock signal based on an output from a phase locked loop or an oscillator, a multiplexing circuit configured to output one of the first clock signal and a second clock signal, a first clock dividing circuit configured to perform a first dividing operation on an output of the multiplexing circuit to generate a third clock signal, a shortstop circuit configured to selectively stop pulses of the third clock signal to generate a fourth clock signal, a second clock dividing circuit configured to perform a second dividing operation on an output of the shortstop circuit to generate a fifth clock signal, and a first clock gating circuit configured to selectively output the fifth clock signal.

BRIEF DESCRIPTION OF THE DRAWINGS

The inventive concept will become apparent and more readily appreciated from the following description of the exemplary embodiments thereof, taken in conjunction with the accompanying drawings in which.

DETAILED DESCRIPTION

Figure 1:
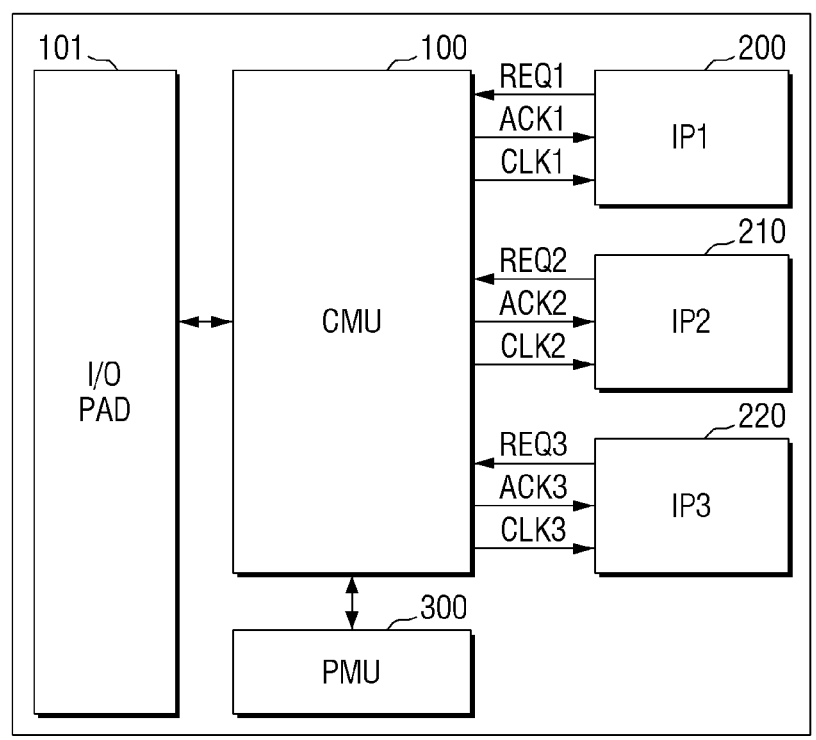
FIG. 1 is a block diagram of a semiconductor device according to an exemplary embodiment of the present inventive concept.

FIG. 1 is a block diagram of a semiconductor device according to an exemplary embodiment of the present inventive concept.

Referring to FIG. 1, the semiconductor device according to an exemplary embodiment of the present inventive concept includes an input/output (I/O) pad 101, a clock management unit (CMU) 100, a power management unit (PMU) 300, and a logic block (e.g., one or more logic circuits). For example, the logic block may be implemented as one or more intellectual property (IP) blocks 200 through 220. In an embodiment, an IP block is an IP core or reusable unit of logic or chip layout that is the intellectual property of one party. In an embodiment, the semiconductor device is or includes a system-on-chip (SoC).

The CMU 100 generates an operation (or operating) clock signal that is to be provided to each of the first through third IP blocks 200 through 220. For example, the CMU 100 may generate first through third clock signals CLK1 through CLK3.

The first through third IP blocks 200 through 220 may be connected to a system bus and communicate with each other through the system bus. In an embodiment, each of the first through third IP blocks 200 through 220 include a processor, a graphic processor, a memory controller, an input and output interface block, etc.

The CMU 100 may provide the first clock signal CLK1 to the first IP block 200. The CMU 100 may provide the second clock signal CLK2 to the second IP block 210. The CMU 100 may provide the third clock signal CLK3 to the third IP block 220.

Any one of the first through third IP blocks 200 through 220 may transmit a clock request signal to the CMU 100 according to a full handshake method (e.g., a synchronous handshake). The clock request signal may indicate that the corresponding IP block desires for the CMU 100 to provide it with a clock signal or desires for the CMU 100 to stop providing it with the clock signal. In an embodiment, in a full handshake method, the CMU 100 responds to the clock request signal with a clock acknowledgement signal indicating it is currently providing or is about to provide the requested clock signal, or it has stopped providing or is about to stop providing the requested clock signal. In an embodiment, the CMU 100 respond with a clock acknowledgement signal indicating only that it is acknowledging receipt of the clock request signal without providing information on the state of the clock signal.

For example, the first IP block 200 may transmit a first clock request signal REQ1 to the CMU 100 according to the full handshake method. The CMU 100 may transmit a first clock acknowledgement signal ACK1 to the first IP block 200 in response to receipt of the first clock request signal REQ1. At the same time or prior to transmitting the first clock acknowledgement signal ACK1, the CMU 100 may transmit the first clock signal CLK1 to the first IP block 200.

In an embodiment, an interface between the CMU 100 and the first through third IP blocks 200 through 220 has the format of the full handshake method. In an embodiment, the interface may be implemented to follow, but not limited to, a Low Power Interface (LPI), a Q-Channel Interface or a P-Channel Interface of ARM Ltd.

Clock gating may be used to divide a computer system into small functional blocks and then cut off power supply to unused parts. Since not all parts of the computer system are always in operation, blocks in unused parts may be stopped to reduce power consumption and generation of heat in the stopped blocks.

The CMU 100 according to an exemplary embodiment of the inventive concept performs clock gating on some of the first through third IP blocks 200 through 220 which do not require operation clock signals. The CMU 100 can reduce power consumption by automatically performing clock gating without creating errors in IP block operation.

The PMU 300 controls a power supply to the semiconductor device. For example, when the semiconductor device enters a standby mode, the PMU 300 cuts off power supply to the SoC by turning off a power control circuit. Here, the PMU 300 continuously consumes power. However, since the power consumed by the PMU 300 is far smaller than that consumed by the entire semiconductor device, the power consumption of the semiconductor device is significantly reduced in the standby mode.

Specifically, when the SoC is in the standby mode, the PMU 300 may cut off power supply to the CMU 100. This may correspond to a case where there is no clock request from the first through third IP blocks 200 through 220. For example, the PMU 300 may cut off power supply to the CMU 100 if none of the IP blocks have made a request for a clock signal within a pre-defined period of time.

Figure 2:
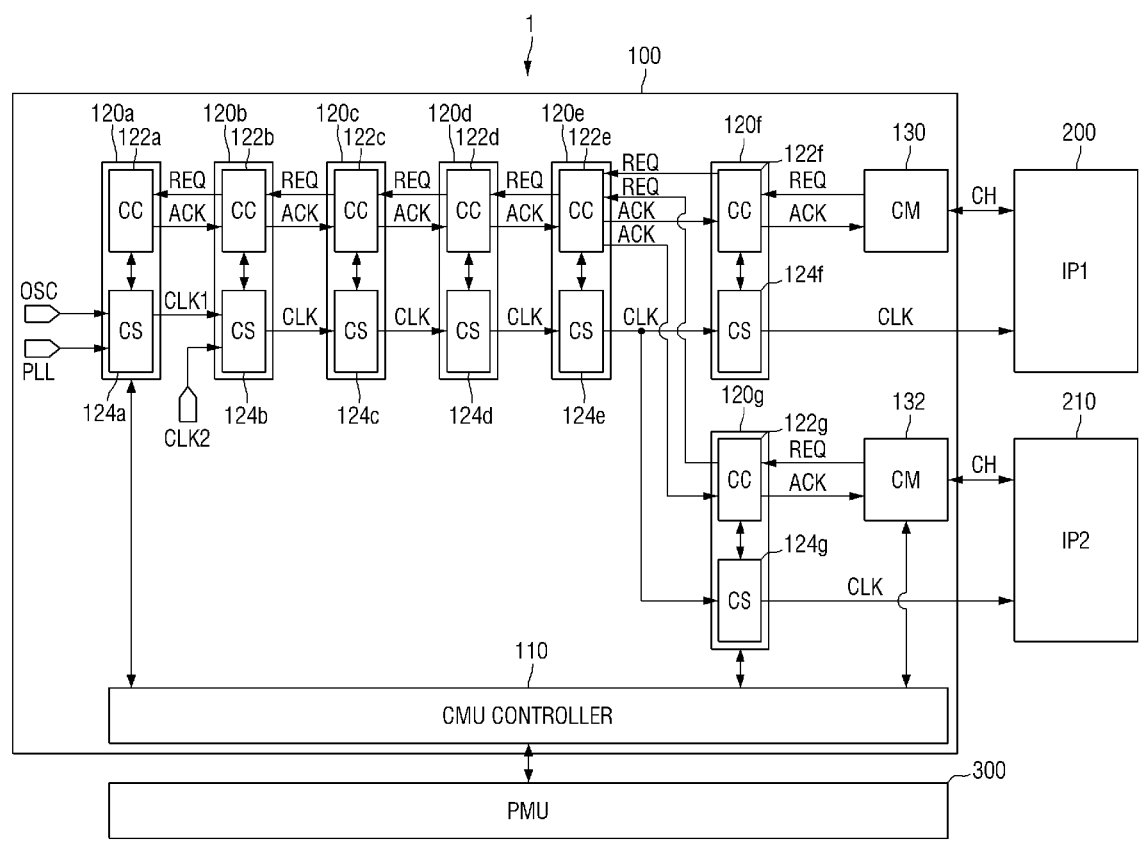
FIG. 2 is a block diagram of a clock management unit (CMU) included in a semiconductor device according to an exemplary embodiment of the present inventive concept.

FIG. 2 is a block diagram of the CMU 100 included in a semiconductor device according to an exemplary embodiment of the present inventive concept.

Referring to FIG. 2, the CMU 100 includes clock components 120a through 120g (e.g., clock gating circuits), channel management circuits (CM) 130 and 132, and a CMU controller 110. The clock components 120a through 120g are configured to generate clock signals that are to be provided to the IP blocks 200 and 210, and the channel management circuits 130 and 132 are disposed between the clock components 120f and 120g and the IP blocks 200 and 210 to provide communication channels CH between the CMU 100 and the IP blocks 200 and 210. The CMU controller 110 provides clock signals to the IP blocks 200 and 210 using the clock components 120a through 120g. In an alternate embodiment, the channel management circuits 130 and 132 are omitted and the last clock component(s) provide communication channels CH between the CMU 100 and the IP blocks 200 and 210.

In some embodiments, the communication channels CH provided by the channel management circuits 130 and 132 may be implemented to follow, but not limited to, LPI, Q-Channel Interface or P-Channel Interface of ARM Ltd. The communication channels CH can also be implemented to follow a different communication protocol.

The clock components 120a through 120g include clock sources (CS) 124a through 124g (e.g., clock signal generators) and clock control circuits (CC) 122a through 122g which control the clock sources 124a through 124g, respectively. The clock sources 124a through 124g may include, for example, a multiplexer (MUX) circuit, a clock dividing circuit, a shortstop circuit, and a clock gating circuit.

The clock components 120a through 120g form a parent-child relationship with each other. In the current embodiment, the clock component 120a is a parent of the clock component 120b, and the clock component 120b is a child of the clock component 120a and a parent of the clock component 120c. In addition, the clock component 120e is a parent of two clock components 120f and 120g, and the clock components 120f and 120g are children of the clock component 120e. In the current embodiment, the clock component 120a located closest to a phase locked loop (PLL) is referred to as a root clock component, and the clock components 120f and 120g located closest to the IP blocks 200 and 210 may be referred to as leaf clock components. The parent-child relationship is also, inevitably, formed between the clock control circuits 122a through 122g and between the clock sources 124a through 124g according to the parent-child relationship between the clock components 120a through 120g.

The clock control circuits 122a through 122g exchange a clock request REQ and an acknowledgement ACK for the clock request REQ between a parent and a child and provide clock signals to the IP blocks 200 and 210.

If the IP block 200 does not need a clock signal, for example, if the IP block 200 needs to be in a sleep state, the CMU 100 stops providing the clock signal to the IP block 200.

Specifically, the channel management circuit 130 transmits to the IP block 200 a first signal indicating that it will stop providing a clock signal under the control of the CMU 100 or the CMU controller 110. The IP block 200 which receives the first signal transmits to the channel management circuit 130 a second signal indicating that the provision of the clock signal can be stopped after the completion of an operation being processed. The channel management circuit 130 which receives the second signal from the IP block 200 requests the clock component 120f, i.e., its parent to stop providing the clock signal.

In an example, if the communication channel CH provided by the channel management circuit 130 follows Q-Channel Interface, the channel management circuit 130 transmits a QREQn signal having a first logic value (e.g., logic low, hereinafter indicated by reference character "L") to the IP block 200 as the first signal. Then, when receiving a QACCEPTn signal having the first logic value from the IP block 200 as the second signal, the channel management circuit 130 transmits a clock request REQ (e.g., a signal) having the first logic value to the clock component 120f. In this case, the clock request REQ having the first logic value is a "clock provision stop request."

The clock control circuit 122f which receives the clock request REQ (i.e., the clock provision stop request) having the first logic value from the channel management circuit 130 stops providing a clock signal by disabling the clock source 124f. For example, the clock control circuit 122f can disable the clock source 124f by providing a disable signal to the clock source 124f. Accordingly, the IP block 200 can enter a sleep mode. In this process, the clock control circuit 122f may provide an acknowledgement ACK having the first logic value to the channel management circuit 130. However, it should be noted that even if the channel management circuit 130 receives the acknowledgement ACK having the first logic value after transmitting the clock provision stop request having the first logic value, it may not guarantee the stoppage of clock provision by the clock source 124f. In an embodiment, the acknowledgement ACK merely means the clock control circuit 122f is aware of the fact that the clock component 120f (i.e., a parent of the channel management circuit 130) no longer needs to provide a clock signal to the channel management circuit 130.

Meanwhile, the clock control circuit 122*f* of the clock component 120*f* transmits a clock request REQ having the first logic value to the clock control circuit 122*e* of the clock component 120*e* which is its parent. If the IP block 210 also does not need a clock signal, for example, if the clock control circuit 122*e* receives the clock provision stop request from the clock control circuit 122*g*, the clock control circuit 122*e* stops providing the clock signal by disabling the clock source 124*e* (e.g., the clock dividing circuit). Accordingly, the IP blocks 200 and 210 can enter the sleep mode.

The above operation may be performed in the same way for other clock control circuits 122*a* through 122*d*.

Although the clock control circuit 122*f* of the clock component 120*f* transmits the clock request REQ having the first logic value to the clock control circuit 122*e* of the clock component 120*e* which is its parent, if the IP block 210 is running, the clock control circuit 122*e* cannot disable the clock source 124*e*. Only when the IP block 210 no longer needs a clock signal, can the clock control circuit 122*e* disable the clock source 124*e* and transmit a clock request REQ having the first logic value to the clock control circuit 120*d* which is its parent. That is, the clock control circuit 122*e* can disable the clock source 124*e* only when receiving the clock provision stop request from both of the clock control circuits 122*f* and 122*g*.

When the IP blocks 200 and 210 are in the sleep state, all of the clock sources 124*a* through 124*f* may be disabled. Then, when the IP block 200 enters the running state, the CMU 100 resumes providing clock signals to the IP blocks 200 and 210.

The channel management circuit 130 transmits a clock request REQ having a second logic value (e.g., logic high, hereinafter indicated by reference character "H") to the clock control circuit 122*f* of the clock component 120*f* which is its parent and waits for an acknowledgement ACK from the clock control circuit 122*f*. Here, the clock request REQ having the second logic value is a "clock provision request," and the acknowledgement ACK for the clock provision request indicates that clock provision by the clock source 124*f* has been resumed. The clock control circuit 122*f* cannot immediately enable the clock source 124*f* (e.g., the clock gating circuit) but waits for the provision of a clock signal by its parent.

Then, the clock control circuit 122*f* transmits a clock request REQ (i.e., the clock provision request) having the second logic value to the clock control circuit 122*e* which is its parent and waits for an acknowledgement ACK from the clock control circuit 122*e*. This operation may be performed in the same way for the clock control circuits 122*a* through 122*d*. For example, each clock control circuit in the cascade except the first sends a clock provision request to its parent.

The first clock control circuit 122*a* (i.e. the root clock component), which receives a clock request REQ having the second logic value from the clock control circuit 122*b* enables the first clock source 124*a* (e.g., the MUX circuit) and transmits an acknowledgement ACK to the second clock control circuit 122*b*. The second clock control circuit 122*b* enables the second clock source 124*b* in response to receipt of the ACK from the first clock control circuit 122*a*, and transmits an ACK to the third clock control circuit 122*c*. The process repeats with the third, fourth, and fifth clock control circuits 122*c*-122*e*. After the clock sources 124*b* through 124*e* are enabled sequentially in this way, the fifth clock control circuit 122*e* finally transmits to a first leaf clock control circuit 122*f* an acknowledgement ACK notifying the leaf clock control circuit that the clock provision by the clock source 124*e* has been resumed. The first leaf clock control circuit 122*f* which receives the acknowledgement ACK provides a clock signal to the IP block 200 by enabling the clock source 124*f* and provides an acknowledgement ACK to the channel management circuit 130.

As described above, the clock control circuits 122*a* through 122*g* operate according to the full handshake method (e.g., synchronous handshaking) in which a clock request REQ and an acknowledgement ACK for the clock request REQ are exchanged between a parent and a child. Accordingly, the clock control circuits 122*a* through 122*g* can control clock signals provided to the IP blocks 200 and 210 by controlling the clock sources 124*a* through 124*g* hardware-wise.

The clock control circuits 122*a* through 122*g* may transmit a clock request REQ to their parents or control the clock sources 124*a* through 124*g* by operating on their own or under the control of the CMU controller 110. In some embodiments, the clock control circuits 122*a* through 122*g* may respectively include finite state machines (FSMs) which control the clock sources 124*a* through 124*g* according to a clock request REQ exchanged between a parent and a child.

While FIG. 2 shows a tree of clock components including a cascade of five clock components and two leaf clock components, the inventive concept is not limited thereto. In alternative embodiments, one or more of these clock components may be omitted. In a first embodiment, only the first clock component 120*a* and the first leaf clock component 120*f* are present, the second-fifth clock components 120*b*-120*e* are omitted, and the second leaf clock component 120*g* is omitted. In a second embodiment, only the second clock component 120*b* and the first leaf clock component 120*f* are present, the first clock component 120*a* is omitted, the third-fifth clock components 120*c*-120*e* are omitted, and the second leaf clock component 120*g* is omitted. In a third embodiment, only the third clock component 120*c* and the first leaf clock component 120*f* are present, the first-second clock components 120*a*-*b* are omitted, the fourth-fifth clock components 120*d*-*e* are omitted, and the second leaf clock component 120*g* is omitted. In a fourth embodiment, only the fourth clock component 120*d* and the first leaf clock component 120*f* are present, the first-third clock components 120*a*-*c* are omitted, the fifth clock component 120*e* is omitted, and the second leaf clock component 120*g* is omitted. In a fifth embodiment, only the fifth clock component 120*e* and the first leaf clock component 120*f* are present, the first-fourth clock components 120*a*-120*d* are omitted, and the second leaf clock component 120*g* is omitted. These embodiments may be varied further with various other combinations. For example, in a sixth embodiment, the first-second clock components 120*a*-120*b* are present, the first leaf clock component clock 120*f* is present, the third-fifth clock components 120*b*-*e* are omitted, and the second leaf clock component 120*g* is omitted.

In an exemplary embodiment, the first clock component 120*a* is a phase-locked loop (PLL) controller.

In an exemplary embodiment, the PLL controller receives from an oscillator OSC a constant or variable frequency signal oscillated by the oscillator OSC and PLL signal by a PLL, and outputs one of the two received signals based on a certain condition. When the components need the PLL signal, the PLL controller outputs the PLL signal. When the components need the oscillator signal, the PLL controller outputs the oscillator signal. When a component using an output of the PLL is not present, in an embodiment of the inventive concept, the PLL controller turns off the PLL. In an alternate embodiment, when the component using the output of the PLL is not present, the PLL controller automatically controls the PLL to enter a bypass mode. In another alternate embodiment, when the component using the output of the PLL is not present, the PLL controller does not affect the operation of the PLL at all.

The PLL controller can be replaced by any component that generates clock signals. For example, the PLL controller can be implemented using a ring oscillator or a crystal oscillator.

In an exemplary embodiment of the inventive concept, the clock component 120*b* is a clock multiplexer (MUX) unit.

In an embodiment, the clock MUX unit includes the clock control circuit 122*b* and the MUX circuit 124*b*. The clock control circuit 122*b* of the clock MUX unit may operate with a sequential behavior. The clock control circuit 122*b* may control the turning on or off of a clock signal. To change the MUX selection of the clock MUX unit in a state where the clock signal is off, the clock control circuit 122*b* generates a clock request signal. The clock request signal generated by the clock control circuit 122*b* to change the MUX selection may be provided only to a previous parent clock component and a next parent clock component or may be provided to all possible parent clock components. In an alternative embodiment, the clock control circuit 122*b* does not generate the clock request signal to change the MUX selection in a state where the clock signal is off. For example, in this embodiment, the clock control circuit 122*b* only changes the MUX selection when the clock signal is already on.

The clock control circuit 122*b* of the clock MUX unit may transmit the clock request signal only to a parent clock component that is used. The clock MUX unit may have two or more input clock signals. For example, FIG. 2 shows the MUX circuit 124*b* receiving a first clock signal CLK1 output from the first clock control circuit 124*a* and a second clock signal CLK2, which may be received from an external CMU or other external device. The MUX circuit 124*b* can then select one of the first and second clock signals CLK1 and CLK2 for output based on a certain condition.

In an exemplary embodiment of the inventive concept, the clock component 120*c* is a clock dividing unit such as a clock divider circuit (e.g., a frequency dividing circuit). The clock divider circuit takes an input signal of an input frequency and generates an output signal with an output frequency of the input frequency divided by a clock dividing ratio. For example, the dividing ratio may be an integer greater than 1.

In an embodiment, the clock dividing unit includes the clock control circuit 122*c* and a dividing circuit 124*c*. The clock control circuit 122*c* of the clock dividing unit may operate with a sequential behavior. The clock control circuit 122*c* may control the turning on or off of a clock signal output by the dividing circuit 124*c*. To change the clock dividing ratio of the dividing circuit 124*c* in a state where the clock signal is off, the clock control circuit 122*c* may generate a clock request signal. For example, the clock control circuit 122*c* may output a clock request signal to a root clock component that causes the dividing circuit 124*c* to begin receiving a clock signal so it can perform a dividing operation on the received clock signal. In an alternate embodiment, the clock control circuit 122*c* does not generate the clock request signal to change the clock dividing ratio of the dividing circuit 124*c* in the state where the clock signal is off. For example, in this embodiment, the clock control circuit 122*c* only changes the clock dividing ratio when the clock signal is already on.

In an exemplary embodiment, the clock component 120*d* is a shortstop unit. In an embodiment, the shortstop unit provides a clock signal with a plurality of pulses during a first period, stops these pulses during a second period after the first period, and resumes the pulses during third period after the second period.

The shortstop unit includes the clock control circuit 122*d* and the clock gating circuit 124*d*. In an embodiment, the clock gating circuit 124*d* selectively outputs a clock signal based on a certain condition. The clock control circuit 122*d* of the shortstop unit may operate with a sequential behavior. The clock control circuit 122*d* may control turning on or off of a clock signal. When a clock request signal from a child clock component is inactive, the clock control circuit 122*d* may activate the clock gating circuit 124*d*. For example, even though the clock control circuit 122*d* has been notified to stop provisioning a clock signal by a child clock component, the clock control circuit 122*d* may activate the clock gate circuit 124*d* when a certain condition occurs.

In an exemplary embodiment of the inventive concept, each of the leaf clock components 120*f* and 120*g* is a clock gating unit. In an embodiment where the leaf clock components 120*f* and 120*g* are clock gating units, each component includes a clock gate circuit.

The clock gating unit may communicate with at least one of the channel management circuits 130 and 132 according to the full handshake method.

Referring to FIGS. 1 and 2, in an exemplary embodiment of the inventive concept, the PMU 300 transmits a power control signal to the oscillator OSC in response to a wake-up signal received in a standby mode. The oscillator OSC is an oscillation circuit which generates a certain frequency signal and supplies an operation clock signal to a logic block (e.g., clock component 120*a*). A crystal oscillator generates a signal with an accurate and stable oscillation frequency using piezoelectric oscillation of a crystal XTAL.

When power is input to the oscillator OSC, the oscillator OSC begins to oscillate. The oscillator OSC initially outputs a fine and unstable signal and then gradually begins to output a stable oscillation clock signal. The CMU 100 may supply an operation clock signal to the logic block after the oscillation clock signal output from the oscillator OSC is stabilized.

Figure 3:
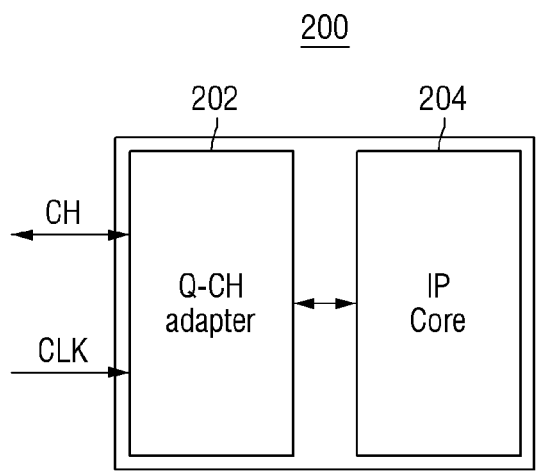
FIG. 3 is a block diagram of an intellectual property (IP) block included in a semiconductor device according to an embodiment of the present inventive concept.

FIG. 3 is a block diagram of an IP block included in a semiconductor device according to an exemplary embodiment of the present inventive concept.

Referring to FIG. 3, the first IP block 200 includes a channel adapter 202 and an IP core 204. In FIG. 3, the first IP block 200 is illustrated as an example. However, the second and third IP blocks 210 and 220 may include substantially the same elements as the first IP block 200.

In an embodiment, the channel adapter 202 communicates with the first channel management circuit 130 according to the full handshake method. Through the channel adapter 202, the first IP block 200 can transmit the first clock request signal REQ1 and receive the first clock signal CLK1. For example, the first IP block 200 may transmit REQ1 to the first channel management circuit 130 and receive the clock signal CLK output by leaf clock component 120*f* as CLK1 in response to transmitting REQ1. Alternatively, through the channel adapter 202, the first IP block 200 can transmit the first clock request signal REQ1, receive an acknowledgement signal indicating the presence of a clock signal, and receive the first clock signal CLK1 directly from a clock component controlled by the channel adapter 202.

The IP core 204 may include, for example, a processor, a graphic processor, a memory controller, an input and output interface block, etc.

Figure 4:
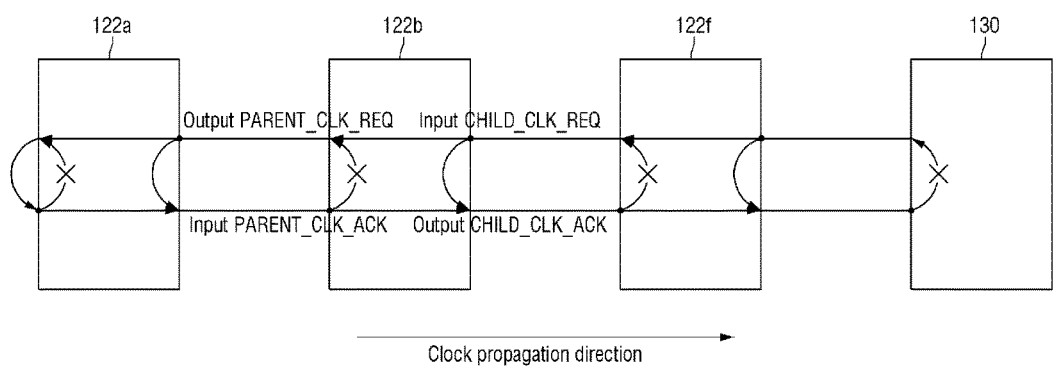
FIG. 4 illustrates signal transmission paths between a plurality of clock control circuits of a CMU according to an exemplary embodiment of the present inventive concept.

FIG. 4 illustrates signal transmission paths between a plurality of clock control circuits.

Referring to FIG. 4, the clock control circuits may operate using a handshake signal including a clock request signal REQ and an acknowledgement (or a clock acknowledgement signal) ACK which is a response signal to the clock request signal REQ. The clock request signal REQ and the clock acknowledgement signal ACK may have, e.g., the first logic value (e.g., logic low) or the second logic value (e.g., logic high). However, the clock request signal REQ and the clock acknowledgement signal ACK can also be implemented in other ways.

In an exemplary embodiment of the inventive concept, a clock consumer transmits the clock request signal REQ having the second logic value to a clock provider, thereby informing the clock provider that a clock signal is needed. Conversely, the clock consumer may transmit the clock request signal REQ having the first logic value to the clock provider, thereby informing the clock provider that the clock signal is no longer needed.

Meanwhile, the clock provider may transmit the clock acknowledgement signal ACK having the second logic value to the clock consumer. The clock acknowledgement signal ACK having the second logic value indicates that a clock signal is being stably provided to the clock consumer by the clock provider. Conversely, the clock provider may transmit the clock acknowledgement signal ACK having the first logic value to the clock consumer. In an embodiment, the clock acknowledgement signal ACK having the first logic value indicates that the clock provider cannot inform the clock consumer about the provision of the clock signal. For example, the clock provider providing the ACK having the first logic level may indicate that the clock provider is merely aware of the clock consumer's desire for a clock signal and unable to notify the clock consumer when the clock signal is being stable provided.

In an example, the clock control circuit 122*b*, as a clock consumer, may transmit, e.g., a clock request signal PARENT_CLK_REQ having the second logic value to the clock control circuit 122*a* which is a clock provider, thereby informing the clock control circuit 122*a* that a clock signal is needed. Accordingly, a clock component (i.e., a clock provider) including the clock control circuit 122*a* may transmit a clock signal to a clock component (i.e., a clock consumer) including the clock control circuit 122*b*. Then, the clock control circuit 122*b* may receive, e.g., a clock acknowledgement signal PARENT_CLK_ACK having the second logic value from the clock control circuit 122*a*.

Meanwhile, the clock control circuit 122*b*, as a clock provider, may receive, e.g., a clock request signal CHILD_CLK_REQ having the second logic value from the clock control circuit 122*f*. Through the reception of the clock request signal CHILD_CLK_REQ having the second logic value, the clock control circuit 122*b* may become aware that the clock control circuit 122*f* which is a clock consumer needs a clock signal. Accordingly, the clock component (i.e., a clock provider) including the clock control circuit 122*b* may provide a clock signal to a clock component (i.e., a clock consumer) including the clock control circuit 122*f*. Then, the clock control circuit 122*b*, as a clock provider, may transmit, e.g., a clock acknowledgement signal CHILD_CLK_ACK having the second logic value to the clock control circuit 122*f*.

In another example, the clock control circuit 122*b*, as a clock consumer, may transmit, e.g., the clock request signal PARENT_CLK_REQ having the first logic value to the clock control circuit 122*a* which is a clock provider, thereby informing the clock control circuit 122*a* that a clock signal is no longer needed. Accordingly, the clock control circuit 122*b* may receive, e.g., the clock acknowledgement signal PARENT_CLK_ACK having the first logic value from the clock control circuit 122*a*. The clock acknowledgement signal PARENT_CLK_ACK having the first logic value indicates that clock provision by the clock provider is not guaranteed.

Meanwhile, the clock control circuit 122*b*, as a clock provider, may receive, e.g., the clock request signal CHILD_CLK_REQ having the first logic value from the clock control circuit 122*f*. The clock request signal CHILD_CLK_REQ having the first logic value indicates that the clock control circuit 122*f* which is a clock consumer no longer needs a clock signal. Accordingly, the clock control circuit 122*b* may transmit, e.g., the clock acknowledgement signal CHILD_CLK_ACK having the second logic value to the clock control circuit 122*f*. The clock acknowledgement signal CHILD_CLK_ACK having the second logic value indicates that the clock provision by the clock provider is not guaranteed.

It should be noted that a combinational path between these clock control circuits may include a first path (e.g., a first wire or communication channel) through which the clock control circuit 122*b* transmits the clock request signal PARENT_CLK_REQ to the clock control circuit 122*a* which is its parent and then receives the clock acknowledgement signal PARENT_CLK_ACK from the clock control circuit 122*a* which is its parent and a second path (e.g., a second wire or communication channel) through which the clock control circuit 122*b* receives the clock request signal CHILD_CLK_REQ from the clock control circuit 122*f* which is its child and then transmits the clock acknowledgement signal CHILD_CLK_ACK to the clock control circuit 122*f* which is its child but that the combinational path does not include a path (indicated by reference character 'X' in FIG. 4). For example, if the path X were present, the clock acknowledgement signal PARENT_CLK_ACK received from the clock control circuit 122*a* could pass through the path X or the clock request signal PARENT_CLK_REQ could pass through path X.

The clock request signal REQ and the clock acknowledgement signal ACK are implemented according to the full handshake method, and a clock provider and a clock consumer may belong to a single clock domain or to different clock domains. When a clock provider and a clock consumer belong to a single clock domain, they operate in response to a same reference clock signal. When a clock provider and a clock consumer belong to different clock domains, they operate in response to different reference clock signals.

In an exemplary embodiment, the clock MUX circuit, the clock dividing circuit, the clock gating circuit, etc. connected respectively to the clock control circuits for communication use different clock domains from the clock control circuits. That is, a clock frequency in a signal line which transmits a clock request signal may be different from a clock frequency of an operation clock signal actually provided.

Figure 5A:
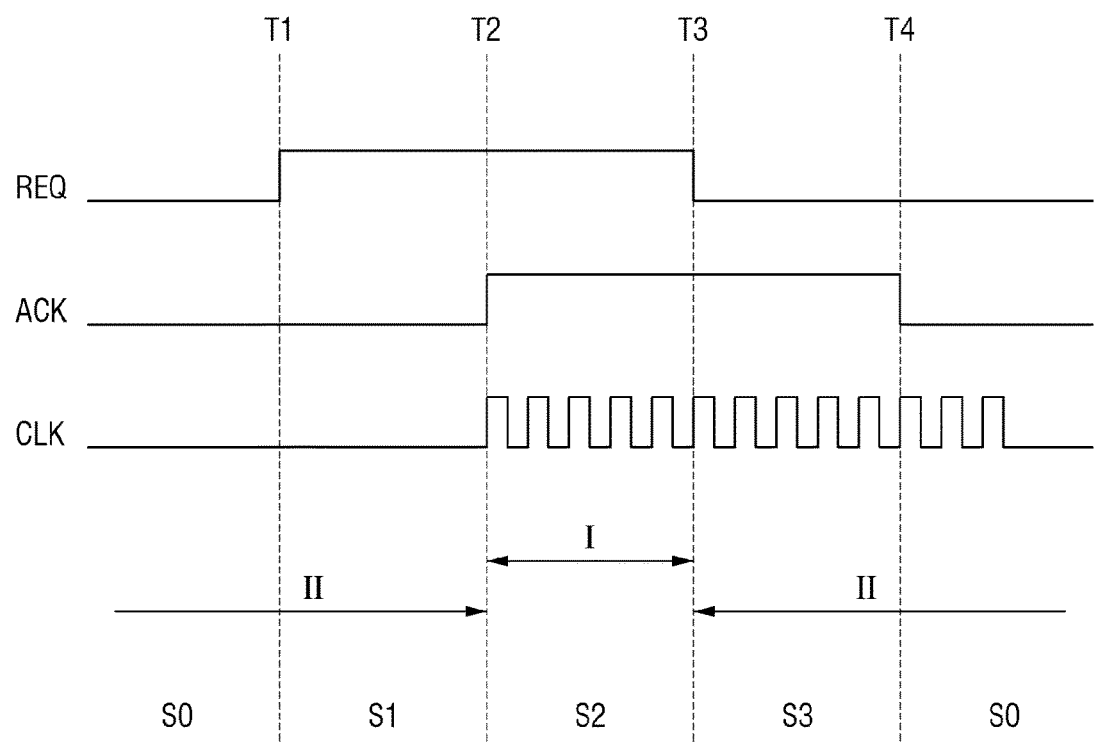
FIG. 5A illustrates a clock request signal and a clock acknowledgement signal that may be used in a CMU according to an exemplary embodiment of the present inventive concept.
Figure 5B:
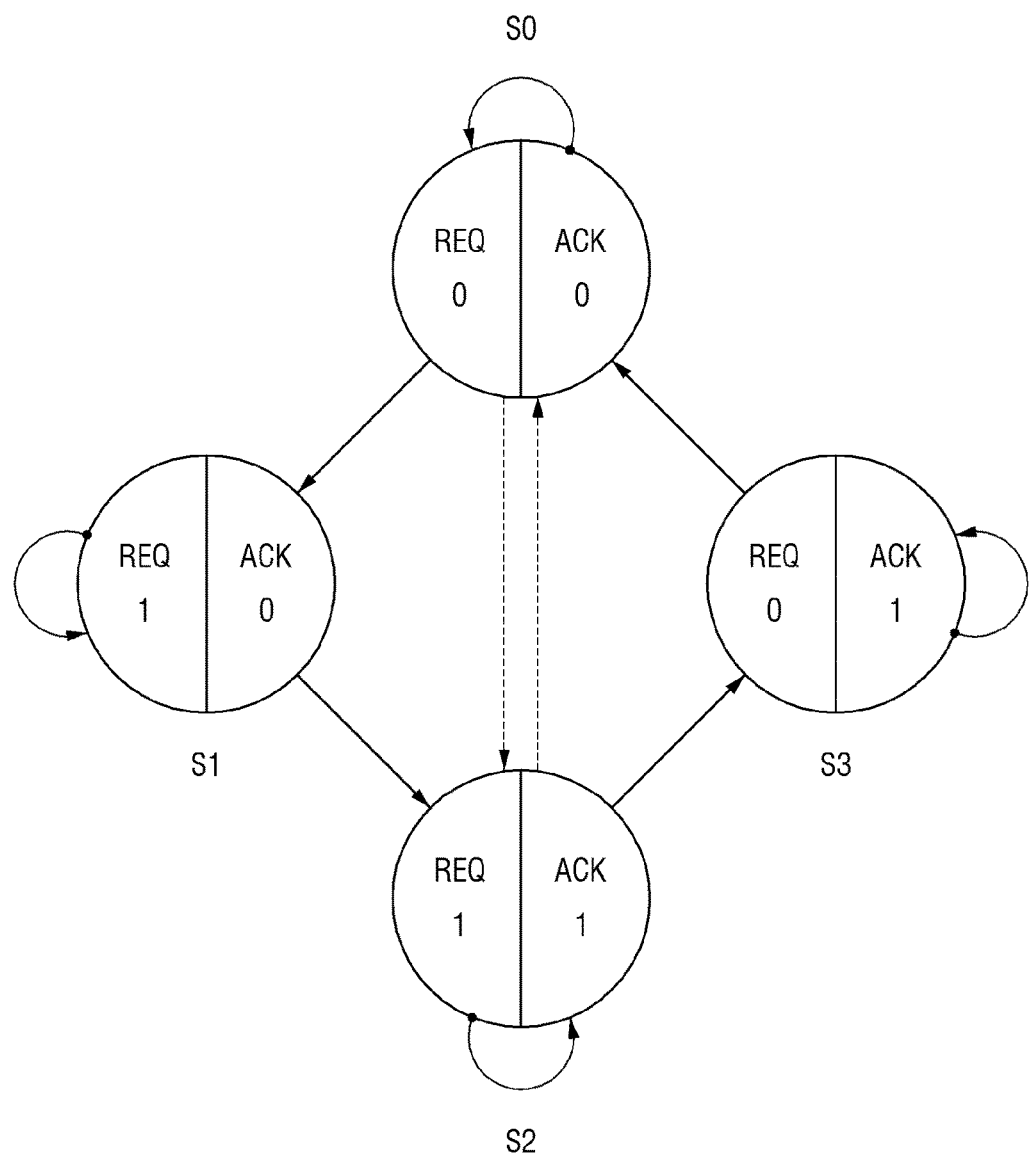
FIG. 5B illustrates clock level transitions for the clock request signal and the clock acknowledgement signal that may occur in a CMU according to an exemplary embodiment of the present inventive concept.

FIG. 5A illustrates a clock request signal REQ and a clock acknowledgement signal ACK used herein. FIG. 5B illustrates clock level transitions for the clock request signal REQ and the clock acknowledgement signal ACK used herein.

Referring to FIG. 5A, the clock request signal REQ transits to the second logic value at a time T1. This may indicate that a clock consumer informs a clock provider that the clock consumer needs a clock signal CLK. After the time T1, the clock provider may provide the clock signal CLK to the clock consumer.

At a time T2, the clock provider transmits the clock acknowledgement signal ACK having the second logic value to the clock consumer. This indicates that the clock signal CLK is being stably provided to the clock consumer by the clock provider (see section I).

At a time T3, the clock request signal REQ transits to the first logic value. This may indicate that the clock consumer informs the clock provider that the clock signal CLK is no longer needed. After the time T3, the clock provider may stop providing the clock signal CLK to the clock consumer or may still continue to provide the clock signal CLK.

At a time T4, the clock provider may transmit the clock acknowledgement signal ACK having the first logic value to the clock consumer. This indicates that the clock provider cannot inform the clock consumer about the provision of the clock signal CLK.

That is, in FIG. 5A, a section in which the stable provision of the clock signal CLK to the clock consumer by the clock provider is guaranteed is only the section I. In the other section II, it cannot be known whether the clock signal CLK is being provided to the clock consumer by the clock provider.

In FIG. 5B, in a case where the second logic value is expressed as '1' and the first logic value is expressed as '0,' possible combinations of the clock request signal REQ and the clock acknowledgement signal ACK and possible transitions between them are illustrated.

Referring to FIG. 5B together with FIG. 5A, a state S0 is before the time T1 and after the time T4, and a state S1 is from the time T1 to the time T2. In addition, a state S2 is from the time T2 to the time T3, and a state S3 is from the time T3 to the time T4. A combination of values of the clock request signal REQ and the clock acknowledgement signal ACK changes sequentially from the state S0 to the state S1, the state S2, the state S3 and then to the state S0 (see solid arrows).

If a circuit is implemented such that the clock request signal REQ and the clock acknowledgement signal ACK simultaneously transit to the second logic value at the time T1, the combination of the values of the clock request signal REQ and the clock acknowledgement signal ACK may switch from the state S0 directly to the state S2. Similarly, if the circuit is implemented such that the clock request signal REQ and the clock acknowledgement signal ACK simultaneously transit to the first logic value at the time T3, the combination of the values of the clock request signal REQ and the clock acknowledgement signal ACK may switch from the state S2 directly to the state S0 (see dotted arrows).

The full handshake method will now be described with reference to FIGS. 1, 2 and 4 again.

According to the full handshake method, when the first IP block 200 needs a clock signal, it activates the first clock request signal REQ1. For example, the first IP block 200 sets the first clock request signal REQ1 to a high state.

The CMU 100 activates the first clock acknowledgement signal ACK1 for the first clock request signal REQ1 in response to the activation of the first clock request signal REQ1. That is, the CMU 100 sets the first clock acknowledgement signal ACK1 to a high state.

The CMU 100 may transmit the first clock signal CLK1 to the first IP block 200 before the activation of the first clock acknowledgement signal ACK1. Alternatively, the CMU 100 may transmit the first clock signal CLK1 to the first IP block 200 at the same time as the activation of the first clock acknowledgement signal ACK1.

When the first IP block 200 does not need a clock signal, the first clock request signal REQ1 is deactivated. That is, the first IP block 200 sets the first clock request signal REQ1 to a low state.

When the first clock request signal REQ1 is in the low state, the CMU 100 sets the first clock acknowledgement signal ACK1 to a low state. At the same time, the CMU 100 may deactivate the first clock signal CLK1.

The first IP block 200 may operate normally while the first clock acknowledgement signal ACK1 is active. For example, the first IP block 200 may operate normally while the first clock acknowledgement ACK1 is in a high state. The first IP block 200 may switch to a sleep mode when it senses that the first clock acknowledgment signal ACK1 has reached the low state.

The full handshake method of the CMU 100 according to exemplary embodiments of the inventive concept will now be described with reference to FIGS. 1 and 2. The full handshake method will be described based on the assumption that the clock components 120a through 120f of FIG. 2 are a PLL controller, a clock MUX unit, a first clock dividing unit, a shortstop unit, a second clock dividing unit and a first clock gating unit, respectively. However, this is merely an example in which the inventive concept can be implemented, and the scope of the present disclosure is not limited to this example. In an embodiment, the PLL controller disables the PLL in response to a request signal from a child clock component, and then relies on the OSC. In an embodiment, the shortstop unit includes a shortstop circuit that is configured to temporarily stop a clock signal for a period of time. For example, the shortstop circuit maintains pulses of the clock signal during a first period, sets the clock signal to a constant low during a second period (e.g., disables the pulses), and restores the pulse of the clock signal during a third period.

The PLL controller, the clock MUX unit, the first clock dividing unit, the shortstop unit, the second clock dividing unit and the first clock gating unit may include the clock sources 124a through 124f, respectively.

Specifically, the PLL controller may include a clock MUX circuit which receives signals from the oscillator OSC and the PLL. The clock MUX unit may include a clock MUX circuit which receives a plurality of clock signals. The first clock dividing unit may include a first clock dividing circuit. The shortstop circuit may include a first clock gating circuit. The second clock dividing unit may include a second clock dividing circuit. The first clock gating unit may include a second clock gating circuit.

In addition, the PLL controller may include the clock control circuit 122a. The clock MUX unit may include the clock control circuit 122b. The first clock dividing unit may include the clock control circuit 122c. The shortstop circuit may include the clock control circuit 122d. The second clock dividing unit may include the clock control circuit 122e. The first clock gating unit may include the clock control circuit 122f.

Each of the clock control circuits 122a through 122f may communicate according to the full handshake method. For example, each of the clock control circuits 122a and 122b may support the full handshake method between the PLL controller and the clock MUX unit.

Each of the clock control circuits 122b and 122c may support the full handshake method between the clock MUX unit and the first clock dividing unit.

Each of the clock control circuits 122c and 122d may support the full handshake method between the first clock dividing unit and the shortstop circuit.

Each of the clock control circuits 122d and 122e may support the full handshake method between the shortstop circuit and the second clock dividing unit.

Each of the clock control circuits 122e and 122f may support the full handshake method between the second clock dividing unit and the first clock gating unit.

Likewise, each of the clock control circuit 122f and the channel management circuit 130 may support the full handshake method between the first clock gating unit and the channel management unit 130.

The first IP block 200 may request the CMU 100 to provide an operation clock signal according to the full handshake method. For example, when the first IP block 200 needs an operation clock signal, it may activate a clock request signal. That is, when the first IP block 200 needs an operation clock signal, it may transmit the activated clock request signal to the CMU 100.

The channel management circuit 130 receives the activated clock request signal. The channel management circuit 130 transmits the activated clock request signal to the first clock gating unit (e.g., clock component 120f). The first clock gating unit transmits the activated clock request signal to the second clock dividing unit (e.g., clock component 120e). The second clock dividing unit transmits the activated clock request signal to the shortstop circuit (e.g., clock component 120d). The shortstop circuit transmits the activated clock request signal to the first clock dividing unit (e.g., clock component 120c). The first clock dividing unit transmits the activated clock request signal to the clock MUX unit (e.g., clock component 120b). The clock MUX unit transmits the activated clock request signal to the PLL controller (e.g., clock component 120a).

In an exemplary embodiment, each of the PLL controller, the clock MUX unit, the first clock dividing unit, the shortstop unit, the second clock dividing unit, the first clock gating unit and the first channel management circuit 130 is implemented as a combinational circuit. Therefore, the activated clock request signal may be transmitted at a time to the first channel management circuit 130 through the PLL controller.

The PLL controller activates a clock acknowledgement signal for the activated clock request signal. That is, the PLL controller transmits the activated clock acknowledgement signal in response to the activated clock request signal to the clock MUX unit. At the same time, the PLL controller transmits a clock signal CLK to the clock MUX unit. For example, the PLL controller may transmit the clock signal CLK to the clock MUX unit at the same time it transmits the activated clock acknowledgement signal.

The clock MUX unit transmits the activated clock acknowledgement signal to the first clock dividing unit. At the same time, the clock MUX unit transmits the clock signal CLK to the first clock dividing unit. For example, the clock MUX unit may transmit the clock signal CLK to the first clock dividing unit at the same time it transmits the activated clock acknowledgement signal.

The first clock dividing unit transmits the activated clock acknowledgement signal to the shortstop circuit. At the same time, the first clock dividing unit transmits the clock signal CLK to the shortstop circuit. For example, the first clock dividing unit may transmit the clock signal CLK to the shortstop circuit at the same time it transmits the activated clock acknowledgement signal.

The shortstop unit transmits the activated clock acknowledgement signal to the second clock dividing unit. At the same time, the shortstop unit transmits the clock signal CLK to the second clock dividing unit. For example, the shortstop unit may transmit the clock signal CLK to the second clock dividing unit at the same time it transmits the activated clock acknowledgement signal.

The second clock dividing unit transmits the activated clock acknowledgement signal to the first clock gating unit. At the same time, the second clock dividing unit transmits the clock signal CLK to the first clock gating unit. For example, the second clock dividing unit may transmit the clock signal CLK to the second clock dividing unit at the same time it transmits the activated clock acknowledgement signal.

The first clock gating unit transmits the activated clock acknowledgement signal to the first channel management circuit 130. At the same time, the first clock gating unit provides the clock signal CLK to the first IP block 200. For example, the first clock gating unit may transmit the clock signal CLK to the first channel management circuit 130 at the same time it transmits the activated clock acknowledgement signal.

In the current embodiment, the clock acknowledgement signal may be transmitted at a time to the PLL controller through the first channel management circuit 130.

When the first IP block 200 does not need a clock signal, it may deactivate the clock request signal. That is, when the first IP block 200 does not need a clock signal, it may transmit the deactivated clock request signal to the CMU 100.

The channel management circuit 130 receives the deactivated clock request signal. The channel management circuit 130 may transmit the deactivated clock request signal to the first clock gating unit. The first clock gating unit transmits the deactivated clock request signal to the second clock dividing unit. The second clock dividing unit transmits the deactivated clock request signal to the shortstop circuit. The shortstop circuit may transmit the deactivated clock request signal to the first clock dividing unit. The first clock dividing unit may transmit the deactivated clock request signal to the clock MUX unit. The clock MUX unit may transmit the deactivated clock request signal to the PLL controller.

Each of the PLL controller, the clock MUX unit, the first clock dividing unit, the shortstop unit, the second clock dividing unit, the first clock gating unit and the first channel management circuit 130 may be implemented as a combinational circuit. Therefore, the deactivated clock request signal may be transmitted at a time to the channel management circuit 130 through the PLL controller.

The PLL controller deactivates the clock acknowledgement signal in response to the deactivated clock request signal. That is, the PLL controller may transmit the deactivated clock acknowledgement signal to the clock MUX unit. At the same time, the PLL controller may deactivate the clock signal CLK or may still continue to transmit the clock signal CLK to the clock MUX unit.

The clock MUX unit transmits the deactivated clock acknowledgement signal to the first clock dividing unit. At the same time, the clock MUX unit may transmit the deactivated the clock signal CLK or may still transmit the clock signal CLK to the first clock dividing unit.

The first clock dividing unit transmits the deactivated clock acknowledgement signal to the shortstop circuit. At the same time, the first clock dividing unit may deactivate the clock signal CLK or may still transmit the clock signal CLK to the shortstop unit.

The shortstop circuit transmits the deactivated clock acknowledgement signal to the second clock dividing unit. At the same time, the shortstop circuit may deactivate the clock signal CLK or may still transmit the clock signal CLK to the second clock dividing unit.

The second clock dividing unit transmits the deactivated clock acknowledgement signal to the first clock gating unit. At the same time, the second clock dividing unit may deactivate the clock signal CLK or may still transmit the clock signal CLK to the first clock gating unit.

The first clock gating unit transmits the deactivated clock acknowledgement signal to the channel management circuit 130. At the same time, the first clock gating unit deactivates the clock signal CLK.

Likewise, the clock acknowledgement signal may be transmitted at a time to the PLL controller through the first channel management circuit 130.

Various types of clock components included in a semiconductor device according to embodiments will now be described.

Figure 6:
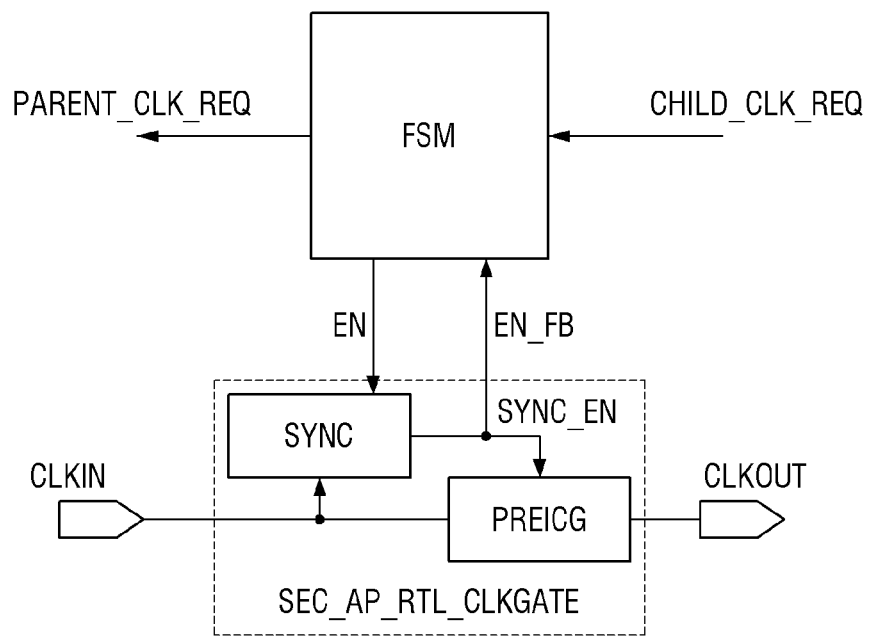
FIG. 6 illustrates the implementation of a clock gating component included in a semiconductor device according to an exemplary embodiment of the present inventive concept.
Figure 7:
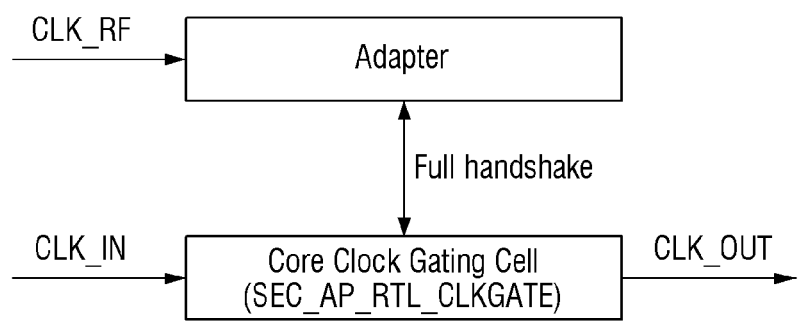
FIG. 7 illustrates the structure of the clock gating component included in a semiconductor device according to an exemplary embodiment of the present inventive concept.
Figure 8:
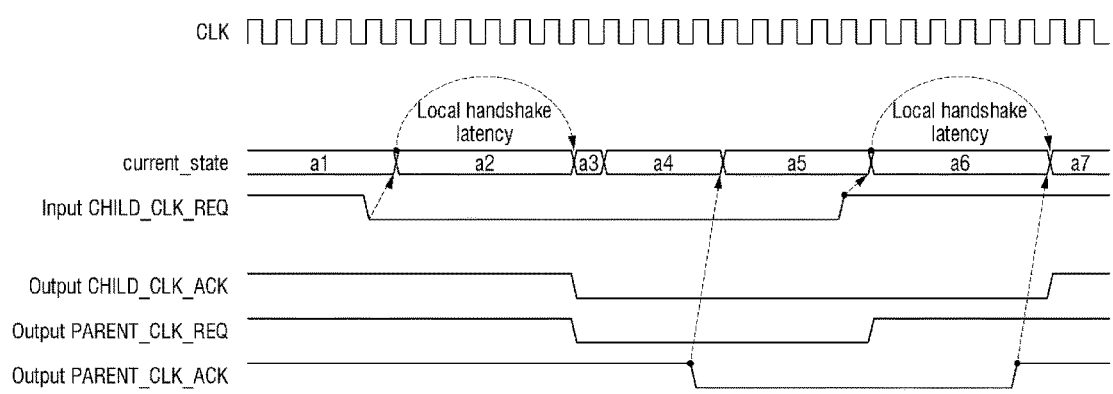
FIG. 8 is a timing diagram illustrating a behavior of the clock gating component included in a semiconductor device according to an exemplary embodiment of the present inventive concept.

FIG. 6 illustrates the implementation of a clock gating component included in a semiconductor device according to an exemplary embodiment of the present inventive concept. FIG. 7 illustrates the structure of the clock gating component included in a semiconductor device according to an exemplary embodiment of the present inventive concept. FIG. 8 is a timing diagram illustrating the behavior of the clock gating component included in a semiconductor device according to an embodiment of the present disclosure. The clock component 120f or clock component 120g may be implemented by the clock gate component of FIG. 6 or FIG. 7.

Referring to FIG. 6, the clock gating component included in a semiconductor device according to an embodiment of the present disclosure includes a finite state machine (FSM) and a clock gating cell SEC_AP_RTL_CLKGATE. Here, the FSM refers to a calculation model or machine composed of a finite number of states and the conversion between the states. The FSM and/or the clock gating cell SEC_AP_RTL_CLKGATE may be implemented using one or more logic gates. In an embodiment, the clock control circuit 122f or clock control circuit 122g is implemented by the FSM, and the clock source 124f or clock source 124g is implemented by the clock gating cell SEC_AP_RTL_CLKGATE. The FSM and the clock gating cell SEC_AP_RTL_CLKGATE of FIG. 6 correspond to an adapter and a core clock gating SEC_AP_RTL_CLKGATE of FIG. 7, respectively. Here, the FSM or the adapter may be operated by a reference clock signal CLK_RF which belongs to a different clock domain from a clock signal CLK generated by a clock component and perform a full handshake with the clock gating cell SEC_AP_RTL_CLKGATE.

The FSM may receive a clock request signal CHILD_CLK_REQ from a child clock component and transmit a clock request signal PARENT_CLK_REQ to a parent clock component or output an enable signal EN for controlling the clock gating cell SEC_AP_RTL_CLKGATE according to the state of the FSM. For example, based on the state of the clock request signal CHILD_CLK_REQ and a corresponding acknowledgement it receives in response to sending the parent clock request signal PARENT_CLK_REQ, the FSM may determine it is time to activate a clock source (e.g., the clock gating cell SEC_AP_RTL_CLKGATE), and accordingly outputs the enable signal EN to cause the clock source to output a clock signal CLK_OUT based on an input clock signal CLK_IN. The clock gating cell SEC_AP_RTL_CLKGATE sends an enable feedback signal EN_FB to the FSM in response to the received enable signal EN or after it has begun outputting the clock signal CLK_OUT in response to the received enable signal.

The clock gating cell SEC_AP_RTL_CLKGATE receives a clock signal CLK_IN according to the enable signal EN output from the FSM and outputs a clock signal CLK_OUT obtained by gating or bypassing the clock signal CLK_IN.

Referring also to FIG. 8, the FSM of the clock gating component may include the following states.

A first state a1 is a state in which the clock gating component provides a clock signal CLK to a child clock component without performing a clock gating operation according to a clock request signal CHILD_CLK_REQ having the second logic value received from the child clock component. It is assumed that the clock request signal CHILD_CLK_REQ received from the child clock component later transits to the first logic value.

A second state a2 is a state in which the clock gating component performs the clock gating operation. Accordingly, after a local handshake latency period required for the clock gating operation of the clock gating component, the clock gating component transmits a clock acknowledgement signal CHILD_CLK_ACK having the first logic value to the child clock component. In addition, the clock gating component transmits a clock request signal PARENT_CLK_REQ having the first logic value to a parent clock component.

In a third state a3, the clock gating component requests the parent clock component to stop providing a clock by transmitting the clock request signal PARENT_CLK_REQ having the first logic value to the parent clock component. In a fourth state a4, the clock gating component waits until it receives a clock acknowledgement signal PARENT_CLK_ACK having the first logic value from the parent clock component. This indicates that since the gating operation of the clock gating component has been completed, the clock gating operation of the parent component can be performed, if necessary.

After the clock acknowledgement signal PARENT_CLK_ACK having the first logic value is received from the parent clock component, the provision of a clock to the child clock component of the clock gating component is completely stopped in a fifth state a5.

Here, when receiving the clock request signal CHILD_CLK_REQ having the second logic value from the child clock component, the clock gating component transmits the clock request signal PARENT_CLK_REQ having the second logic value to the parent clock component and then stops the clock gating operation in a sixth state a6.

After a local handshake latency period required to stop the clock gating operation, if the clock gating component receives the clock acknowledgement signal PARENT_CLK_ACK having the second logic value from the parent clock component, it switches to a seventh state a7. Here, the seventh state a7 is the same as the first state a1.

The clock gating cell SEC_AP_RTL_CLKGATE includes a first logic circuit SYNC and a second logic circuit PREICG. The first logic circuit SYNC provides the enable feedback signal EN_FB to the FSM in response to receipt of the enable signal EN and provides a synchronous enable signal SYNC_EN to the second logic circuit PREICG based on the input clock signal CLK_IN after receiving the enable signal EN. The second logic circuit PREICG outputs the output clock output signal CLK_OUT based on the input clock signal CLK_IN in response to the synchronous enable signal SYNC_EN. The second logic circuit PREICG may be used to ensure that a stable clock signal is output.

Figure 9A:
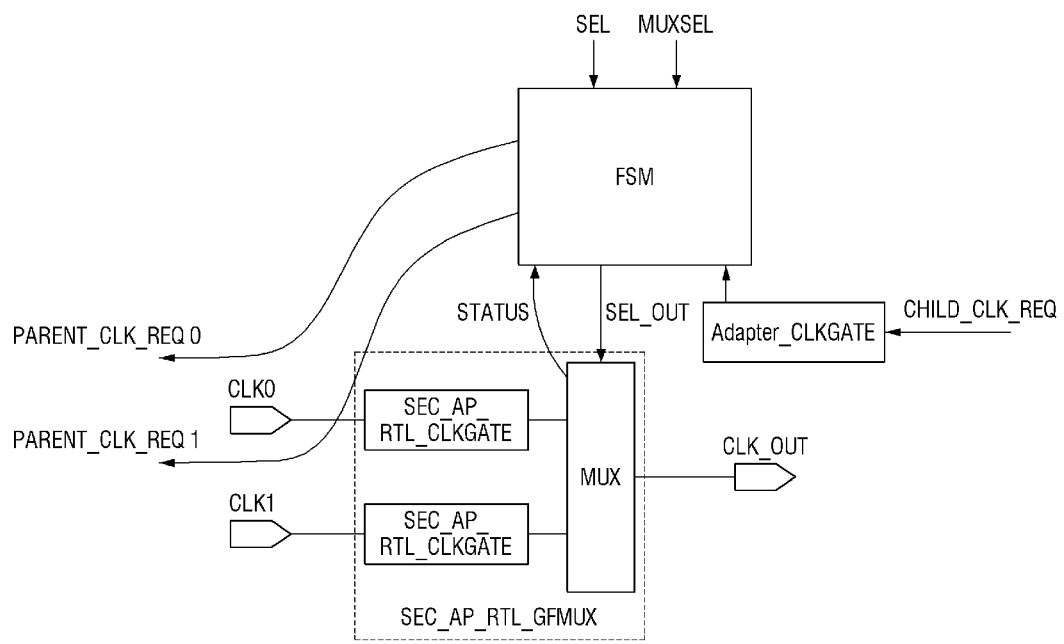
FIG. 9A illustrates the implementation of a clock multiplexer (MUX) component included in a semiconductor device according to an exemplary embodiment of the present inventive concept.
Figure 9B:
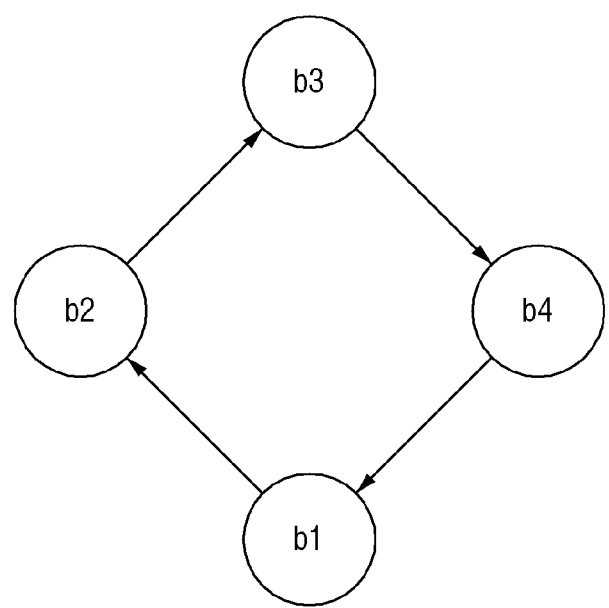
FIG. 9B illustrates a finite state machine (FSM) of the clock MUX component included in a semiconductor device according to an exemplary embodiment of the present inventive concept.
Figure 10:
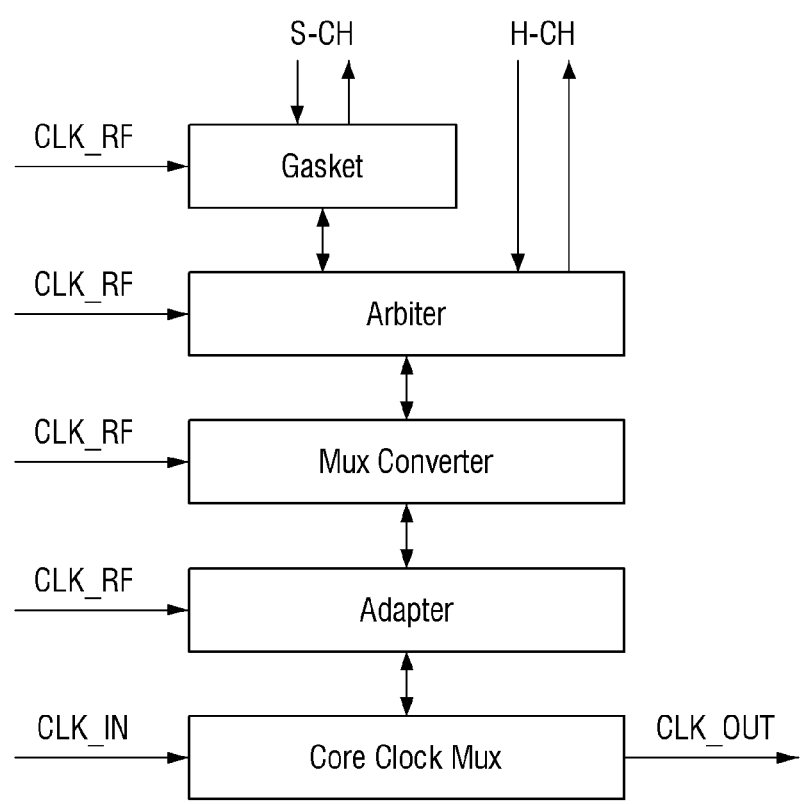
FIG. 10 illustrates the structure of the clock MUX component included in a semiconductor device according to an exemplary embodiment of the present inventive concept.

FIG. 9A illustrates the implementation of a clock MUX component included in a semiconductor device according to an exemplary embodiment of the present inventive concept. In an embodiment, the clock component 120b is implemented by the circuit of FIG. 9A. FIG. 9B illustrates an FSM of the clock MUX component included in a semiconductor device according to an exemplary embodiment of the present inventive concept. FIG. 10 illustrates the structure of the clock MUX component included in a semiconductor device according to an exemplary embodiment of the present inventive concept. FIGS. 11 through 20 are timing diagrams illustrating the behavior of the clock MUX component included in a semiconductor device according to an exemplary embodiment of the present inventive concept.

Referring to FIG. 9A, the clock MUX component included in a semiconductor device according to an exemplary embodiment of the present inventive concept includes an FSM and a MUX circuit SEC_AP_RTL_GFMUX. The MUX circuit SEC_AP_RTL_GFMUX includes first and second logic circuits SEC_AP_RTL_CLKGATE for receiving first and second clock signals CLK0 and CLK1, and a multiplexer MUX, which may provide a STATUS signal to the FSM indicating whether it is currently outputting one of the clock signals or it has receiving an output select signal SEL_OUT from the FSM. The FSM receives a clock request signal CHILD_CLK_REQ through an adaptor gate Adapter_CLKGATE (e.g., a logic circuit) from a child clock component and transmits clock request signals PARENT_CLK_REQ0 and PARENT_CLK_REQ1 to parent clock components. For example, the first parent clock request signal PARENT_CLK_REQ0 may be transmitted to clock component 120a and the second parent clock request signal PARENT_CLK_REQ1 may be transmitted to an external clock component.

Here, the clock MUX component may include a glitch-free MUX. A glitch refers to a temporary malfunction of a computer due to noise.

The FSM receives a select signal SEL. When the FSM determines that a value of the select signal SEL has changed, the FSM compares the select signal SEL and a muxsel signal and determines whether these signals have the same value.

When the select signal SEL and the muxsel signal do not have the same value, the FSM generates a detect change signal. Here, the detect change signal may be generated by toggling a value of the detect change signal having a low state to a high state or by toggling the value of the detect change signal having a high state to a low state.

The clock MUX component outputs a first clock signal CLK0 or a second clock signal CLK1 as a clock signal CLK_OUT in response to the select signal SEL_OUT which is output from the FSM to the MUX. The child clock component receives a clock output from the clock MUX component. The first clock signal CLK0 may be output by clock component 120a and the second clock signal CLK1 may be output by an external clock component.

Referring also to FIG. 9B, the FSM included in the clock MUX component may include the following states.

A first state b1 is a state in which clock gating is performed by hardware. This is a state in which both a parent clock component (of the clock MUX component) which stopped providing a clock to a child clock component and a parent clock component (of the clock MUX component) which is still providing a clock signal exist. In this state, however, it is not guaranteed that all parent clock components of the clock MUX component are in operation. That is, since the operation of unnecessary parent clock components is stopped in this state, power consumption may be at a minimum. Therefore, the clock MUX component cannot change its selection according to the select signal SEL. Unlike the clock gating component, the clock MUX component can maintain an optimum state even when receiving a clock request signal from a child clock component.

In a second state b2, all parent clock components of the clock MUX component are woken up because the clock MUX component needs to change its selection according to the select signal SEL.

A third state b3 is a state in which clock gating by the hardware is not performed. That is, all parent clock components that were woken up are providing clock signals to the clock MUX component. In this state, the clock MUX component can change its selection according to the select signal SEL.

In a fourth state b4, clock gating by the hardware is resumed after the clock MUX component changes its selection according to the select signal SEL. Therefore, the operation of parent clock components which do not need a clock signal begins to be stopped in the fourth state b4. That is, in the fourth state b4, a clock stop request signal PARENT_CLK_REQ is transmitted to the parent clock components which do not need the clock signal.

After receiving a clock acknowledgement signal PARENT_CLK_ACK from the parent clock components which do not need the clock signal, the clock MUX component returns to the first state b1. A fifth state b5 illustrated in FIGS. 11 through 20 is the same as the first state b1.

Referring to FIG. 10, the clock MUX component included in a semiconductor device according to an exemplary embodiment of the present inventive concept includes a gasket (e.g., a register), an arbiter (e.g., an arbitration circuit), a MUX converter, an adapter (e.g., adaptor circuit), and a clock MUX. The gasket, the arbiter, the MUX converter and the adapter perform signal transmission and reception using a reference clock signal CLK_RF, and the adapter controls the clock MUX according to the full handshake method.

The gasket may receive a request for selecting an input to the clock MUX through an S channel (S-CH). The request may include the muxsel signal. In this case, the muxsel signal may be encoded by a 4-phase synchronous full handshake which is performed between the gasket and the arbiter, and transferred to the adapter.

Meanwhile, the arbiter also may receive a request for selecting an input to the clock MUX through an H channel (H-CH). In this case, the arbiter receives the request according to a 4-phase asynchronous full double handshake through the H channel (H-CH). The 4-phase asynchronous full double handshake may include a lock request, a release request, a muxsel signal, which are input to the arbiter; and an acknowledgement which is output from the arbiter. In this case, the muxsel signal may be encoded by a 4-phase synchronous full handshake which is performed between the arbiter and the MUX converter, and transferred to the adapter.

The adapter includes an FSM, which is described with respect to FIGS. 9A and 9B, and the muxsel signal may be decoded by 2-phase asynchronous full handshake which is performed between the adapter and the clock MUX, and input to the clock MUX.

Figure 11:
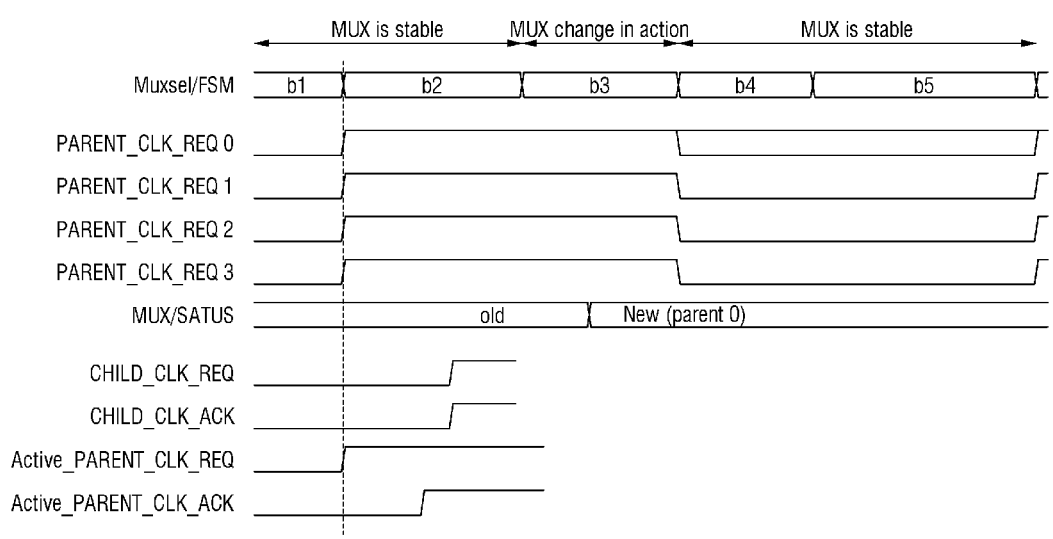
FIGS. 11 through 20 are timing diagrams illustrating the behavior of the clock MUX component included in a semiconductor device according to an exemplary embodiment of the present inventive concept.

Referring to FIG. 11, a clock signal change occurs in a b3 section through the clock MUX component. Here, if a clock request signal of a child is in a low state and a clock acknowledgement signal for the child is in a low state between a b1 section and a b2 section, when a clock acknowledgement signal of a parent becomes a high state, the clock request signal of the child becomes a high state. In FIG. 11, clock request signals transmitted to all parents become a high state between the b2 and b3 sections. However, a clock request signal in a high state can also be transmitted only to a previous parent or a next parent. FIG. 11 illustrates four parent clock requests PARENT_CLK_REQ_0, PARENT_CLK_REQ_1, PARENT_CLK_REQ_2, and PARENT_CLK_REQ_3 to show an example of a clock MUX unit being capable of receiving four different clock signals and communicating with four different parent clock components providing these clock signals. However, embodiments of the clock MUX unit are not limited thereto as fewer or additional parent clock components may be supported in alternate embodiments.

Figure 12:
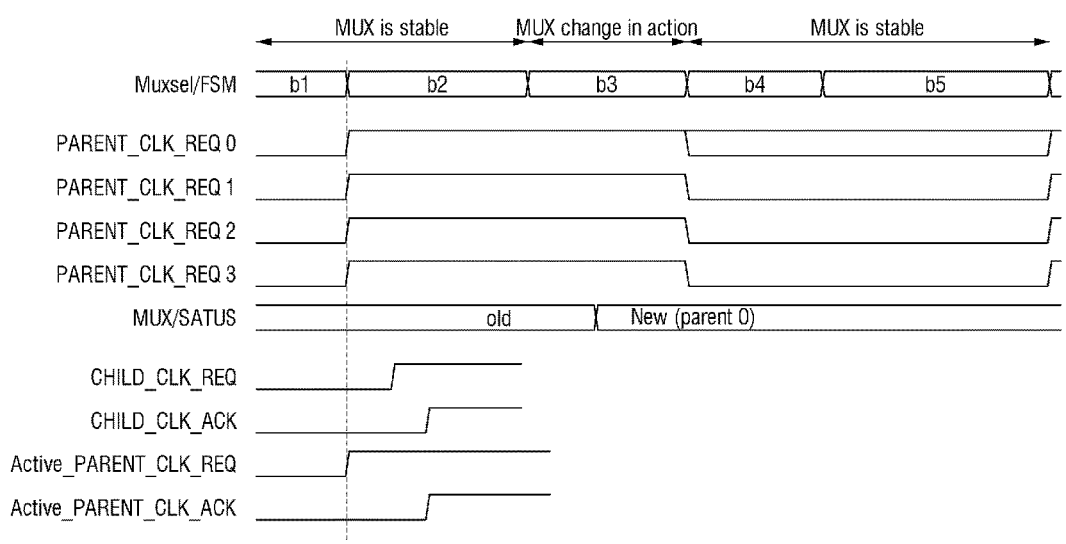

Referring to FIG. 12, if a clock request signal of a child is in a low state and a clock acknowledgement signal for the child is in a low state between the b1 section and the b2 section, the clock request signal of the child becomes a high state before a clock acknowledgement signal of a parent becomes a high state.

Figure 13:
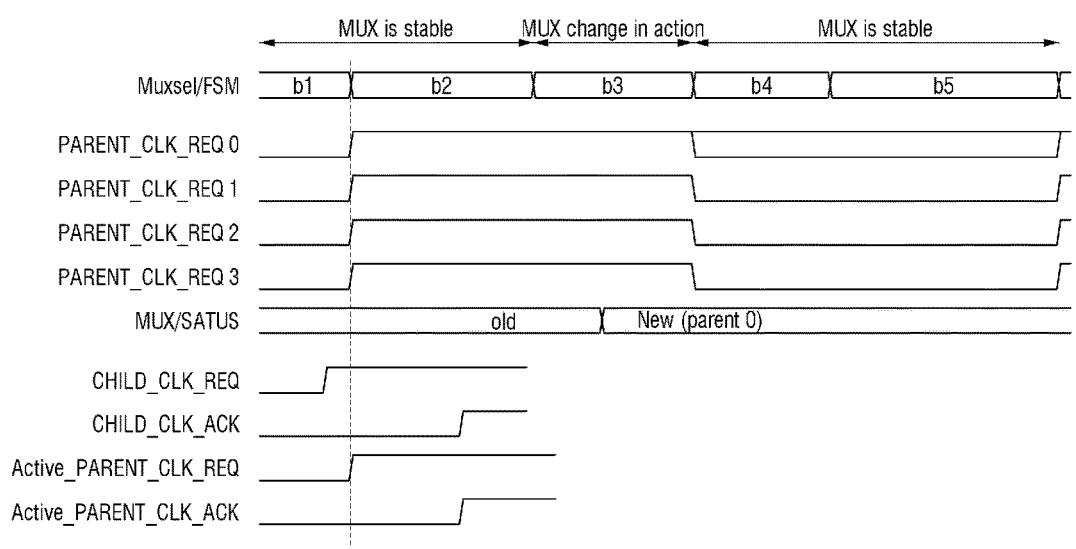

Referring to FIG. 13, between the b1 section and the b2 section, a clock request signal of a child is in a high state, and a clock acknowledgement signal for the child is in a low state.

Figure 14:
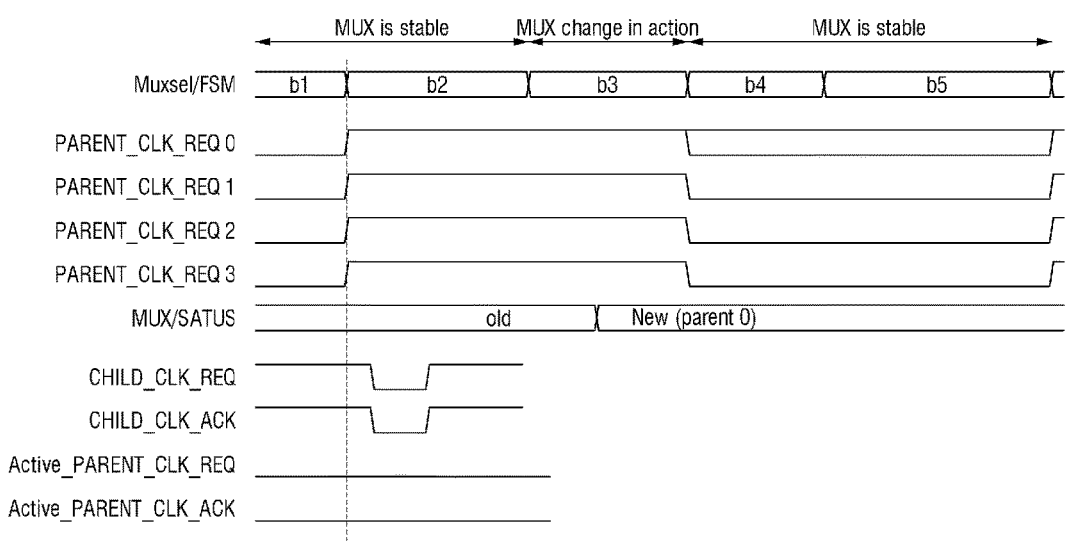

Referring to FIG. 14, between the b1 section and the b2 section, a clock request signal of a child is in a high state, and a clock acknowledgement signal for the child is in a high state.

Figure 15:
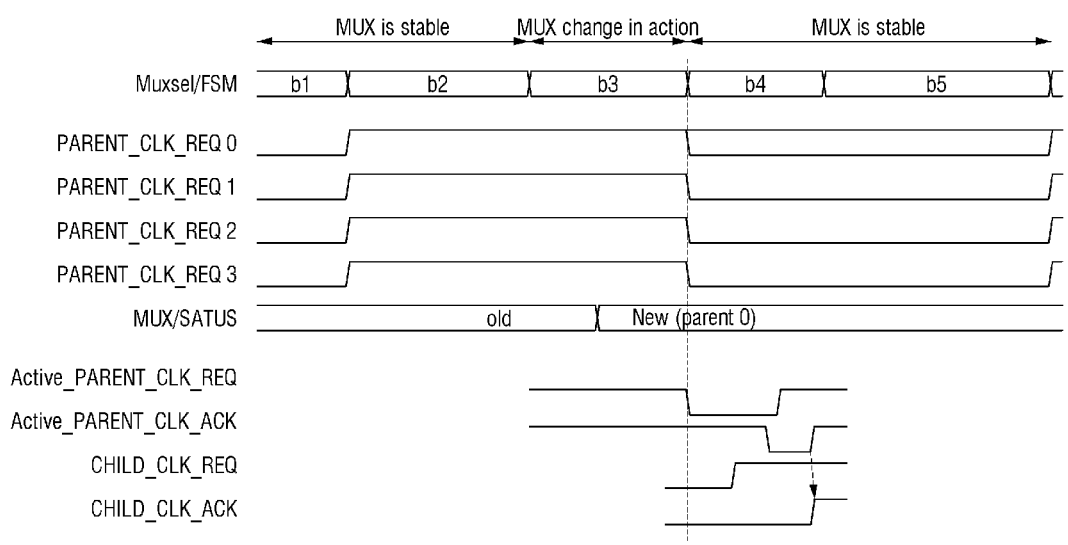

Referring to FIG. 15, between a b3 section and a b4 section, a clock request signal of a child is in a low state, a clock acknowledgement signal for the child is in a low state, and the clock request signal of the child maintains the low state.

Figure 16:
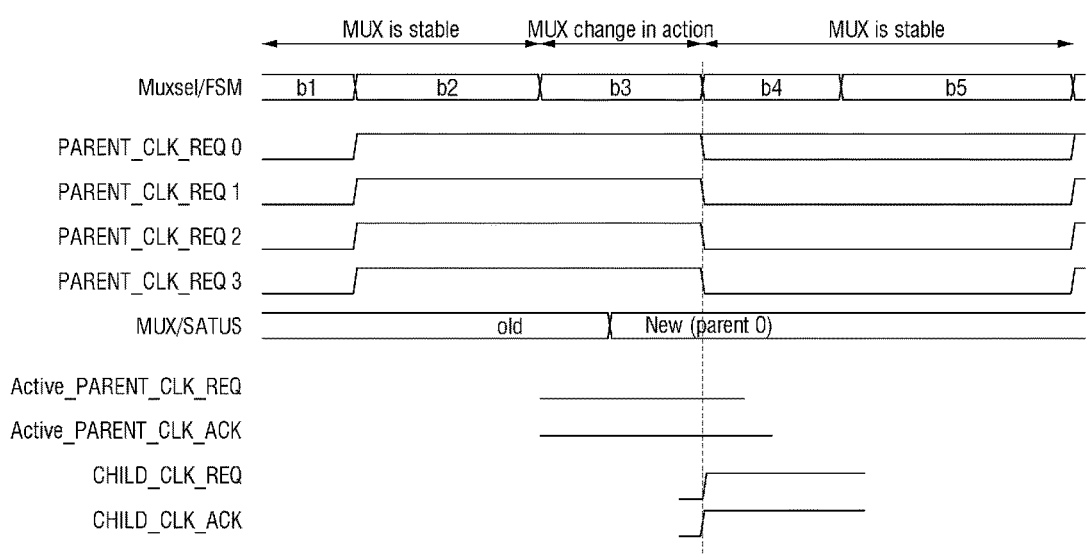

Referring to FIG. 16, between the b3 section and the b4 section, a clock request signal of a child is in a low state, a clock acknowledgement signal for the child is in a low state, and the clock request signal of the child is toggled from the low state to a high state.

Figure 17:
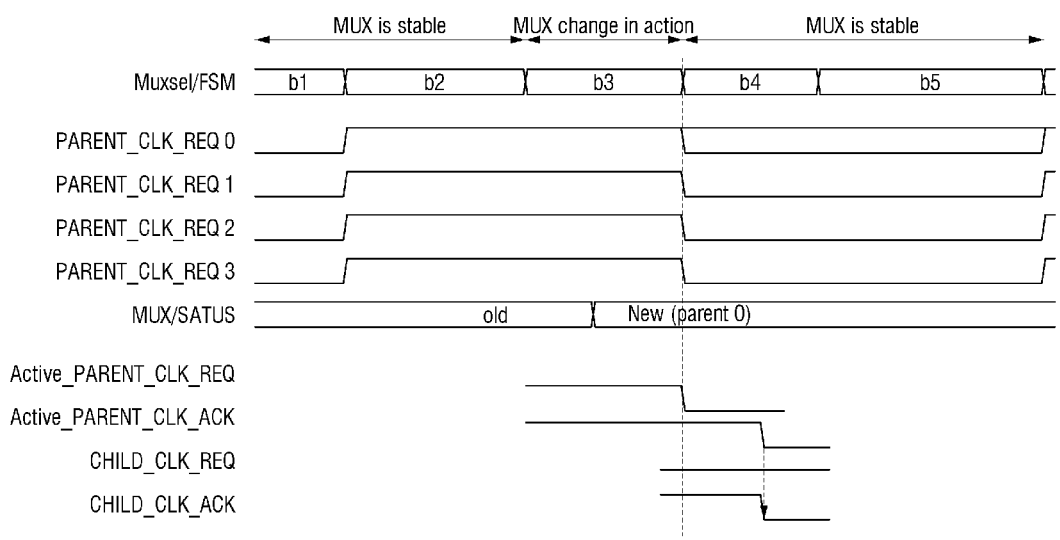

Referring to FIG. 17, between the b3 section and the b4 section, a clock request signal of a child is in a low state, a clock acknowledgement signal for the child is in a high state, and the clock request signal of the child maintains the low state.

Figure 18:
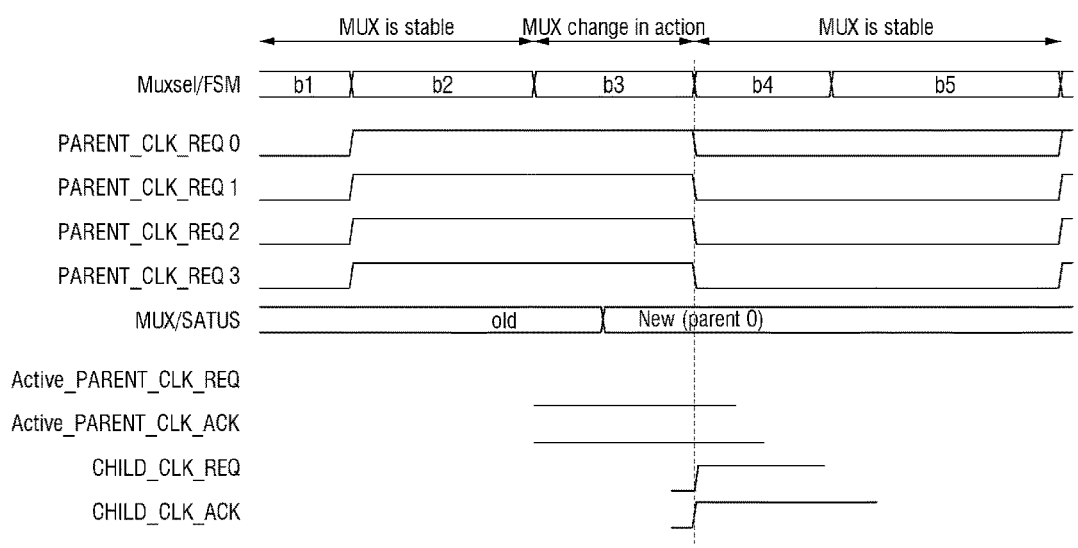

Referring to FIG. 18, between the b3 section and the b4 section, a clock request signal of a child is in a high state, a clock acknowledgement signal for the child is in a low state, and the clock request signal of the child maintains the high state.

Figure 19:
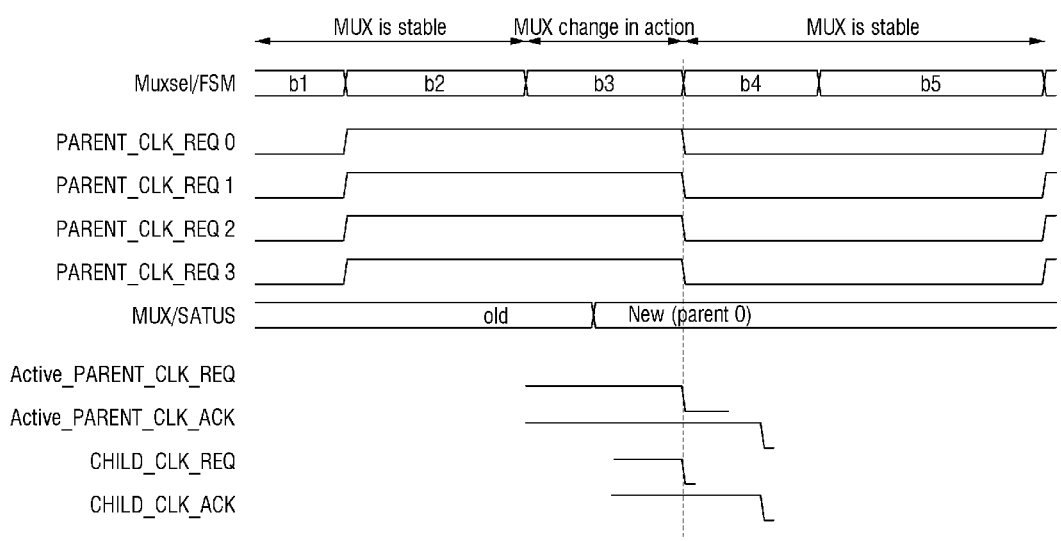

Referring to FIG. 19, between the b3 section and the b4 section, a clock request signal of a child is in a high state, a clock acknowledgement signal for the child is in a high state, and the clock request signal of the child is toggled from the high state to a low state.

Figure 20:
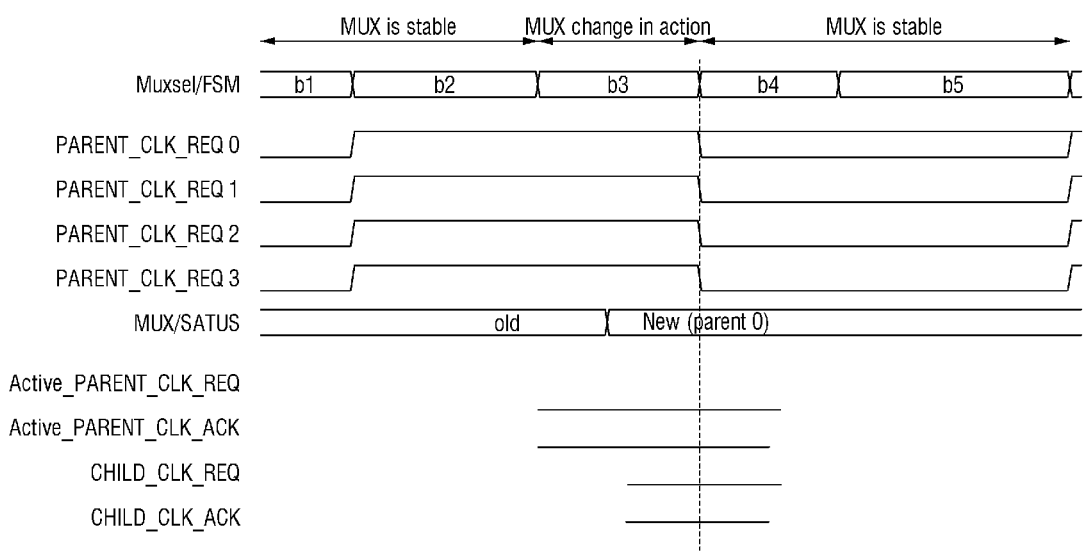

Referring to FIG. 20, between the b3 section and the b4 section, a clock request signal of a child is in a high state, a clock acknowledgement signal for the child is in a high state, and the clock request signal of the child maintains the high state.

Figure 21A:
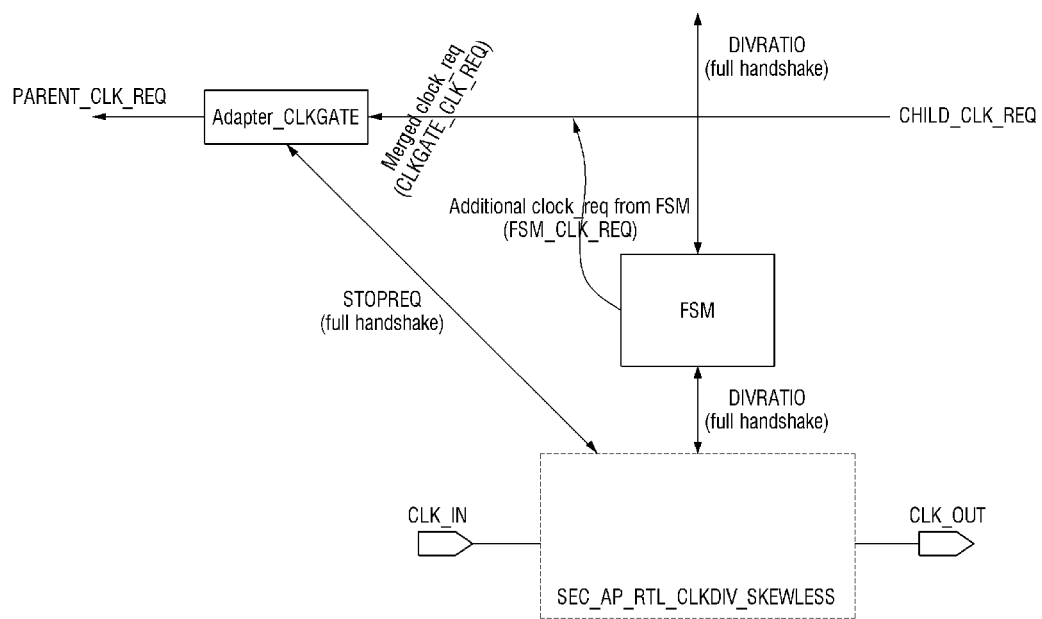
FIG. 21A illustrates a clock dividing component included in a semiconductor device according to an exemplary embodiment of the present inventive concept.
Figure 21B:
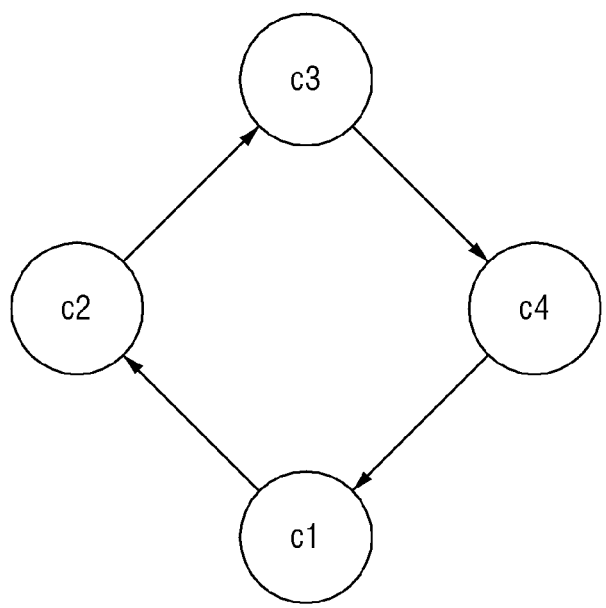
FIG. 21B illustrates an FSM of the clock dividing component included in a semiconductor device according to an exemplary embodiment of the present inventive concept.
Figure 22:
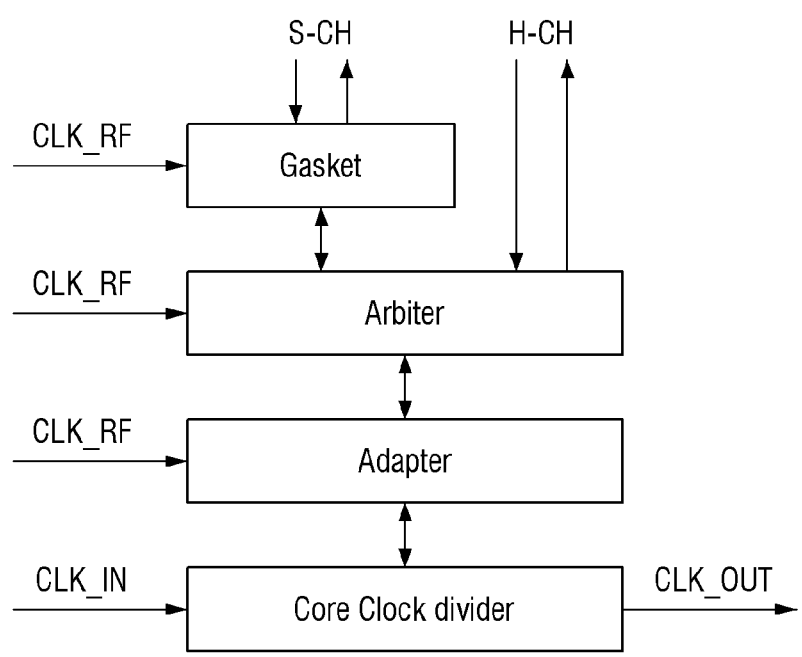
FIG. 22 illustrates a clock dividing component included in a semiconductor device according to an exemplary embodiment of the present inventive concept.
Figure 23:
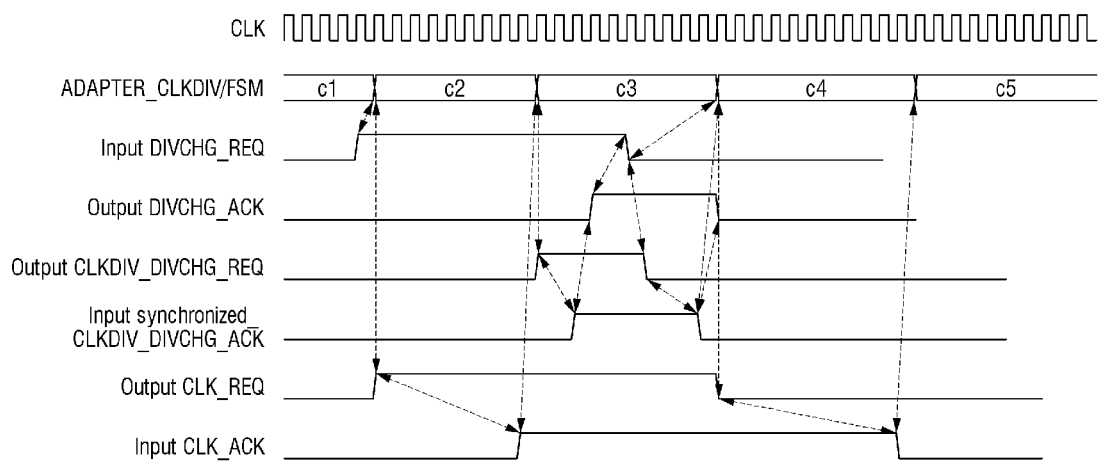
FIG. 23 is a timing diagram illustrating the behavior of the clock dividing component included in a semiconductor device according to an embodiment of the present inventive concept.

FIG. 21A illustrates the implementation of a clock dividing component included in a semiconductor device according to an exemplary embodiment of the present inventive concept. The clock component 120c or clock component 120e may be implemented by the clock dividing component of FIG. 21A. FIG. 21B illustrates an FSM of the clock dividing component included in a semiconductor device according to an exemplary embodiment of the present inventive concept. FIG. 22 illustrates the structure of the clock dividing component included in a semiconductor device according to an exemplary embodiment of the present inventive concept. FIG. 23 is a timing diagram illustrating the behavior of the clock dividing component included in a semiconductor device according to an embodiment of the present disclosure.

Referring to FIG. 21A, the clock dividing component included in a semiconductor device according to an embodiment of the present inventive concept includes an adapter Adapter_CLKGATE (e.g., a logic gate), an FSM, and a clock dividing circuit SEC_AP_RTL_CLKDIV_SKEWLESS. The adapter Adapter_CLKGATE receives a clock request signal CHILD_CLK_REQ from a child clock component and transmits a clock request signal PARENT_CLK_REQ to a parent clock component. The adapter Adapter_CLKGATE may also receive a merged clock request CLKGATE_CLK_REQ that is a merging of the CHILD_CLK_REQ and an additional clock request FSM_CLK_REQ from the FSM. The merged clock request CLKGATE_CLK_REQ may be generated by performing an OR operation on the CHILD_CLK_REQ and the FSM_CLK_REQ. The FSM determines a clock dividing ratio DIVRATIO and provides the determined clock dividing ratio DIVRATIO to the adapter Adapter_CLKGATE. The FSM may control the clock dividing circuit according to the full handshake method. For example, the Adapter_CLKGATE (e.g., one or more logic circuits) may send a stop request signal STOPREQ to the clock dividing circuit SEC_AP_RTL_CLKDIV_SKEWLESS. In an embodiment, the clock dividing circuit SEC_AP_RTL_CLKDIV_SKEWLESS performs a dividing operation on an input clock signal CLK_IN using the clock dividing ratio DIVRATIO to generate an output clock signal CLK_OUT after receiving the clock dividing ration DIVRATIO from the FSM and provides an acknowledgement signal to the FSM.

Referring also to FIG. 21B, the FSM included in the clock dividing component may include the following states.

A first state c1 is a state in which clock gating is performed by hardware. This is a state in which both a parent clock component (of the clock dividing component) which stopped providing a clock signal to a child clock component and a parent clock component (of the clock dividing component) which is still providing a clock signal can exist. In this state, however, it is not guaranteed that all parent clock components of the clock dividing component are in operation. That is, since the operation of unnecessary parent clock components is stopped in this state, power consumption may be at a minimum. Therefore, the clock dividing component cannot change the clock dividing ratio DIVRATIO. For example, in state c1, even though a request for change of the dividing ratio DIVCHG_REQ is input, the clock dividing component cannot change the clock dividing ratio DIVRATIO.

In a second state c2, all parent clock components of the clock dividing component are woken up because the clock dividing component needs to change the clock dividing ratio DIVRATIO. The waking up of the parent clock components may be caused by outputting a clock request CLK_REQ to the parent clock components.

A third state c3 is a state in which clock gating by the hardware is not performed. That is, all parent clock components that were woken up are providing clock signals to the clock dividing component. In this state, the clock dividing component can change the clock dividing ratio. For example, a clock dividing ratio change request CLKDIV_DIVCHG_REQ may be output to cause the change. After the change, and after receipt of an Input synchronization CLK-DIV_DIVCHG_ACK, an acknowledgement of the change DIVCHG_ACK is output.

In a fourth state c4, clock gating by the hardware is resumed after the clock dividing component changes the clock dividing ratio. Therefore, the operation of parent clock components which do not need a clock signal begins to be stopped. That is, in the fourth state c4, a clock stop request signal PARENT_CLK_REQ is transmitted to the parent clock components which do not need the clock signal.

After receiving a clock acknowledgement signal PARENT_CLK_ACK from the parent clock components which do not need the clock signal, the clock dividing component returns to the first state c1. A fifth state c5 illustrated in FIG. 23 is the same as the first state c1.

Referring to FIG. 22, the clock dividing component included in a semiconductor device according to an embodiment of the present disclosure includes a gasket, an arbiter, and an adapter. The gasket, the arbiter, and the adapter perform signal transmission and reception using a reference clock signal CLK_RF, and the adapter controls a clock divider according to the full handshake method.

The gasket may receive a request signal for changing clock dividing ratios through an S channel (S-CH). The request may include the DIVRATIO, which is a divratio signal. In this case, the request signal may be encoded by a synchronous full handshake which is performed between the gasket and the arbiter, and transferred to the adapter.

Meanwhile, the arbiter also may receive a request signal for changing clock dividing ratios through an H channel (H-CH). In this case, the arbiter receives the request signal according to a asynchronous full double handshake through the H channel (H-CH). The 4-phase asynchronous full double handshake may include a lock request, a release request, a divratio signal, which are input to the arbiter; and an acknowledgement which is output from the arbiter. In this case, the request signal may be encoded by a synchronous full handshake which is performed between the arbiter and the adapter, and transferred to the adapter.

The adapter includes an FSM, which is described with respect to FIGS. 21A and 21B, and the request signal may be decoded by an asynchronous full handshake which is performed between the adapter and the clock divider, and input to the clock divider.

Referring to FIG. 23, a change in the clock dividing ratio DIVRATIO occurs in a c3 section. The clock divider operates in response to a clock dividing ratio change request CLKDIV_DIVCHG_REQ transmitted to the clock divider.

Figure 24:
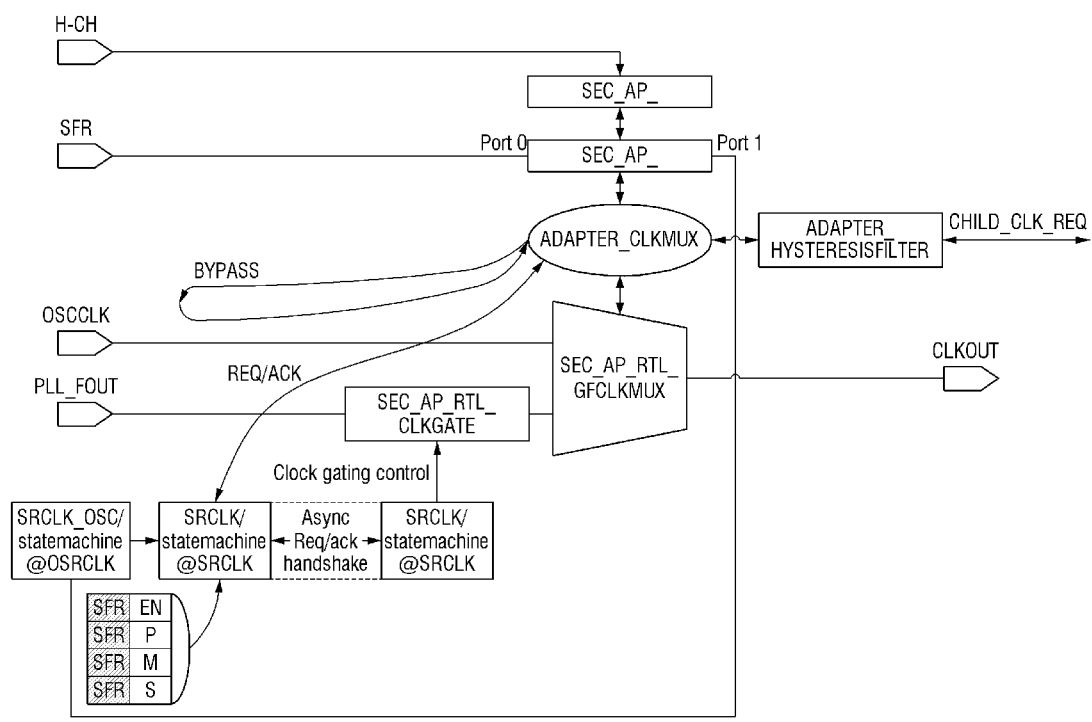
FIG. 24 illustrates a phase locked loop (PLL) controller included in a semiconductor device according to an exemplary embodiment of the present inventive concept.
Figure 25:
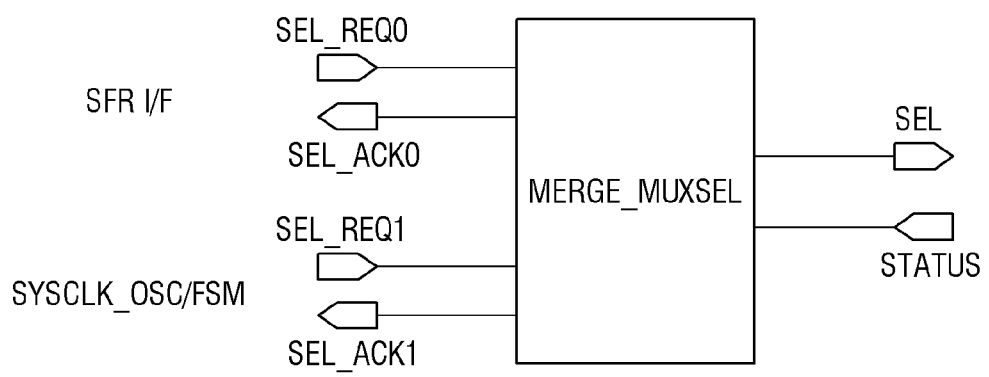
FIG. 25 illustrates a multiplexer of the PLL controller circuit included in a semiconductor device according to an exemplary embodiment of the present inventive concept.
Figure 26:
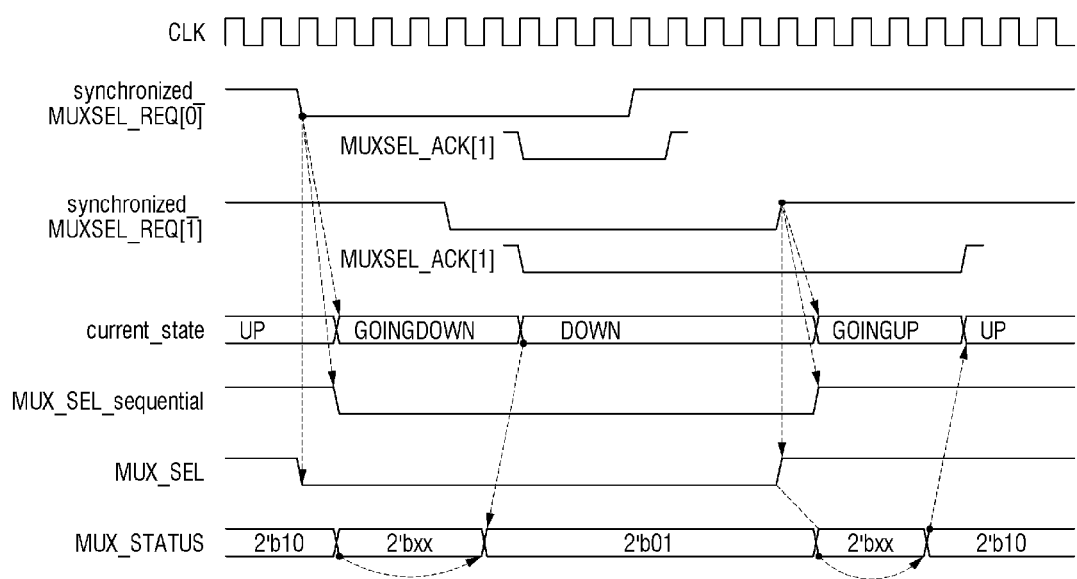
FIGS. 26 and 27 are timing diagrams illustrating a behavior of the PLL controller included in a semiconductor device according to an exemplary embodiment of the present inventive concept.
Figure 27:
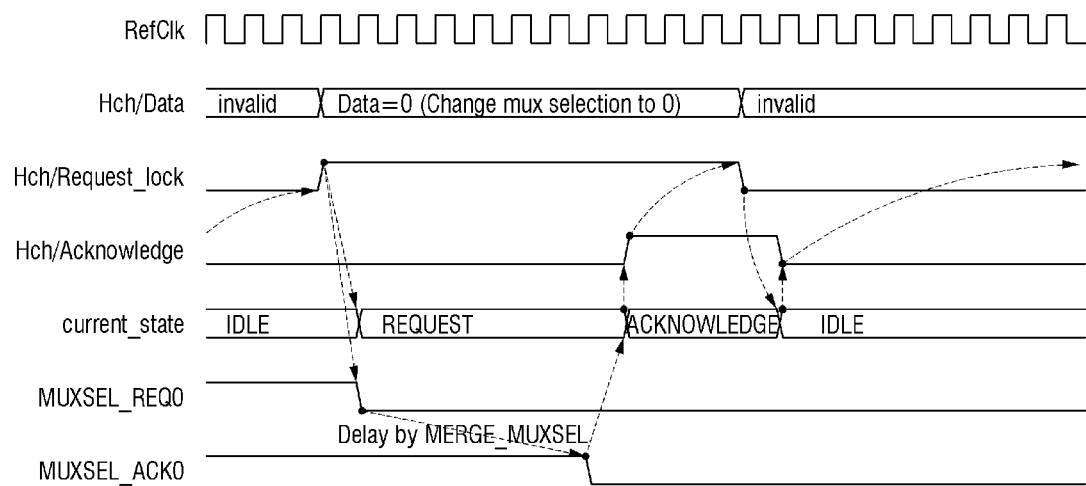

FIG. 24 illustrates the implementation of a PLL controller included in a semiconductor device according to an exemplary embodiment of the present inventive concept. FIG. 25 illustrates the structure of a multiplexer MERGE_MUXSEL of the PLL controller circuit included in a semiconductor device according to an embodiment of the present disclosure. FIGS. 26 and 27 are timing diagrams illustrating the behavior of the PLL controller included in a semiconductor device according to an exemplary embodiment of the present inventive concept.

Referring to FIG. 24, the PLL controller included in a semiconductor device according to an exemplary embodiment of the present inventive concept includes an adapter, a multiplexer, etc. The adapter serves as a control circuit which transmits a request signal and an acknowledgement signal. The adapter may send and receive REQ/ACK to and from a parent clock component when the parent clock component exists, while the adapter may bypass when the parent clock component does not exist.

Referring to FIG. 25, the multiplexer MERGE_MUXSEL communicates with a special function register (SFR) and a system clock oscillator (SYSCLK_OSC) according to the full handshake method and outputs a select signal SEL.

In FIGS. 26 and 27, timing diagrams illustrating the operation of the PLL controller circuit are provided. In particular, FIG. 26 is a timing diagram illustrating the operation of the multiplexer MERGE_MUXSEL, and FIG. 27 is a timing diagram illustrating the operation of TRANS_HCH2PH.

Figure 28:
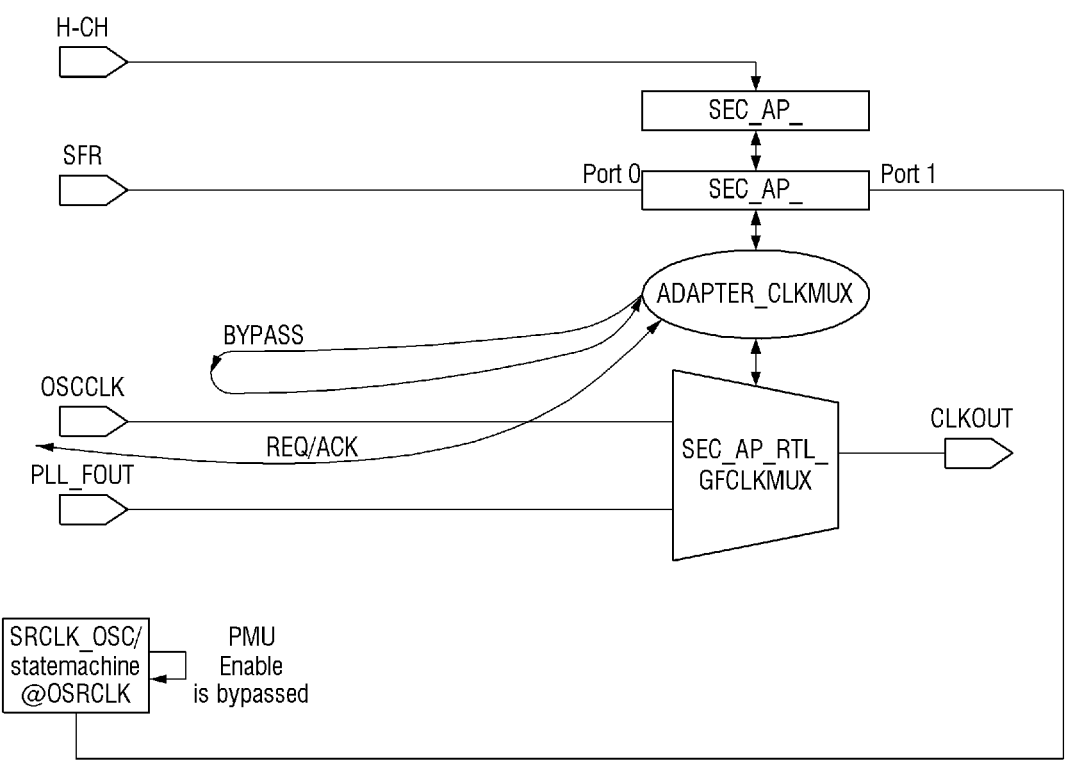
FIG. 28 illustrates a PLL user controller included in a semiconductor device according to an exemplary embodiment of the present inventive concept.

FIG. 28 illustrates the implementation of a PLL user controller included in a semiconductor device according to an exemplary embodiment of the present inventive concept.

Referring to FIG. 28, the PLL user controller includes an adapter, a multiplexer, etc. The adapter serves as a control circuit which transmits a request signal and an acknowledgement signal. The adapter may send and receive REQ/ACK to and from a parent clock component when the parent clock component is exists, while the adapter may bypass when the parent clock component does not exist.

Figure 29:
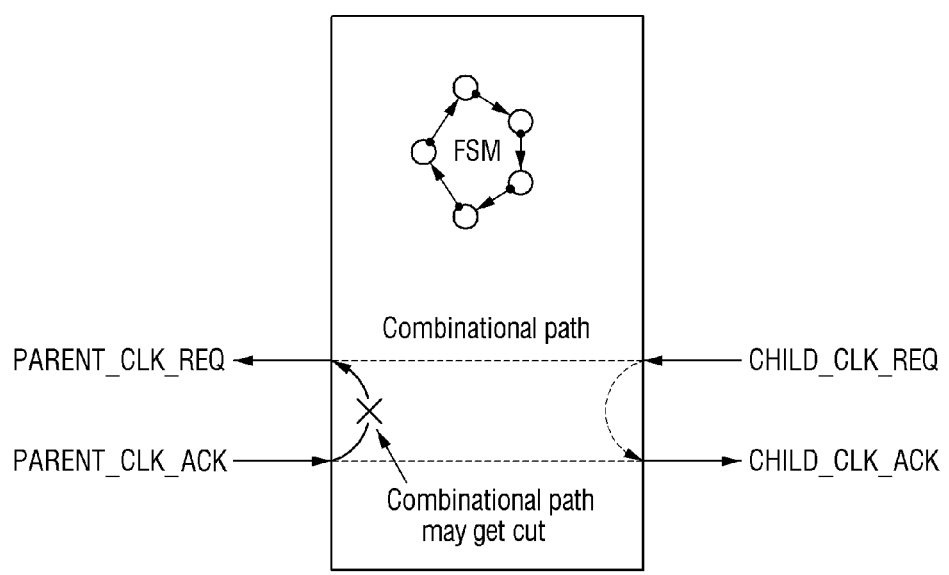
FIG. 29 illustrates an adapter component included in a semiconductor device according to an exemplary embodiment of the present inventive concept.

FIG. 29 illustrates the implementation of an adapter component included in a semiconductor device according to an exemplary embodiment of the present inventive concept.

Referring to FIG. 29, the adapter component merges a plurality of request channels into one channel. The adapter component communicates according to the full handshake method. The adapter component receives a clock request signal from a child and transmits the clock request signal to a parent. In addition, the adapter component receives a clock acknowledgement signal from the parent and transmits the clock acknowledgement signal to the child.

In FIG. 29, a path between CHILD_CLK_REQ and PARENT_CLK_REQ may be implemented using only combinational cells. This path may be utilized to minimize cycle latency of a request path. In FIG. 29, a path between PARENT_CLK_ACK and CHILD_CLK_ACK may be implemented using only combinational cells. This path may be utilized to minimize cycle latency of an acknowledge path. In FIG. 29, a path from CHILD_CLK_REQ to CHILD_CLK_ACK may be implemented using only combinational cells. This path may be utilized to minimize cycle latency of a request-to-acknowledge path. In FIG. 29, a path from PARENT_CLK_ACK to PARENT_CLK_REQ may be implemented using only combinational cells. This path may be utilized to minimize cycle latency of an acknowledge-to-request path. Some of the four paths mentioned above may be intentionally separated by a sequential cell in order to prevent a combinational loop.

Figure 30:
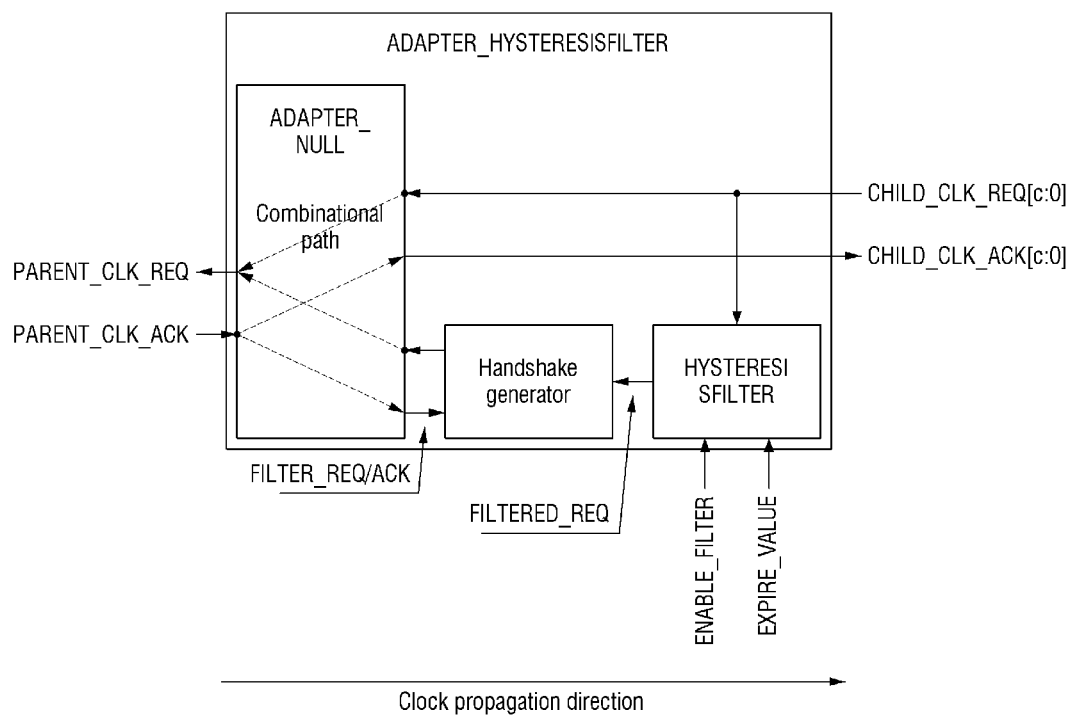
FIG. 30 illustrates the structure of a hysteresis filter included in a semiconductor device according to an exemplary embodiment of the present inventive concept.
Figure 31:
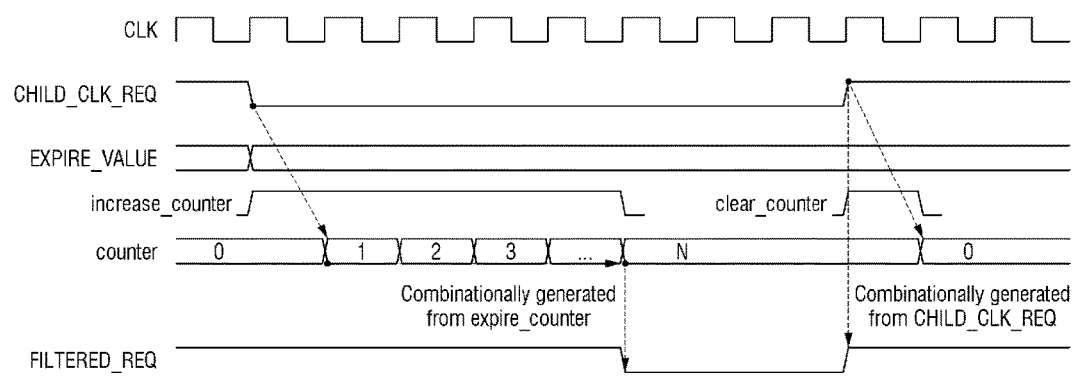
FIGS. 31 through 33 are timing diagrams illustrating a behavior of the hysteresis filter included in a semiconductor device according to an exemplary embodiment of the present inventive concept.
Figure 32:
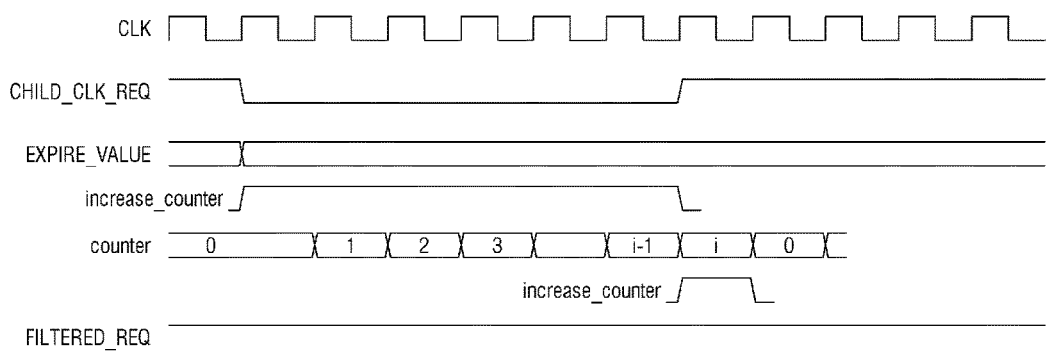
Figure 33:
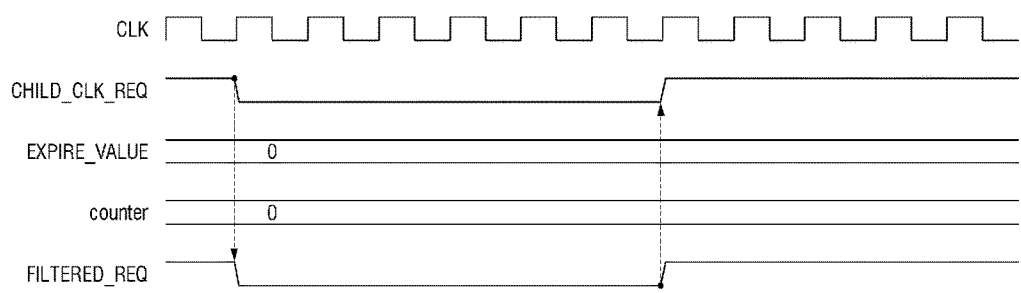

FIG. 30 illustrates the structure of a hysteresis filter included in a semiconductor device according to an exemplary embodiment of the present inventive concept. The adaptor hysteresis filter ADAPTER_HYSTERESISFILTER of FIG. 24 may be implemented by the hysteresis filter of FIG. 30. FIGS. 31 through 33 are timing diagrams illustrating the behavior of the hysteresis filter included in a semiconductor device according to an embodiment of the present disclosure.

Referring to FIG. 30, the hysteresis filter is included in an adapter. Referring to FIGS. 31 through 33, the hysteresis filter generates a request signal filtered using a counter.

Figure 34:
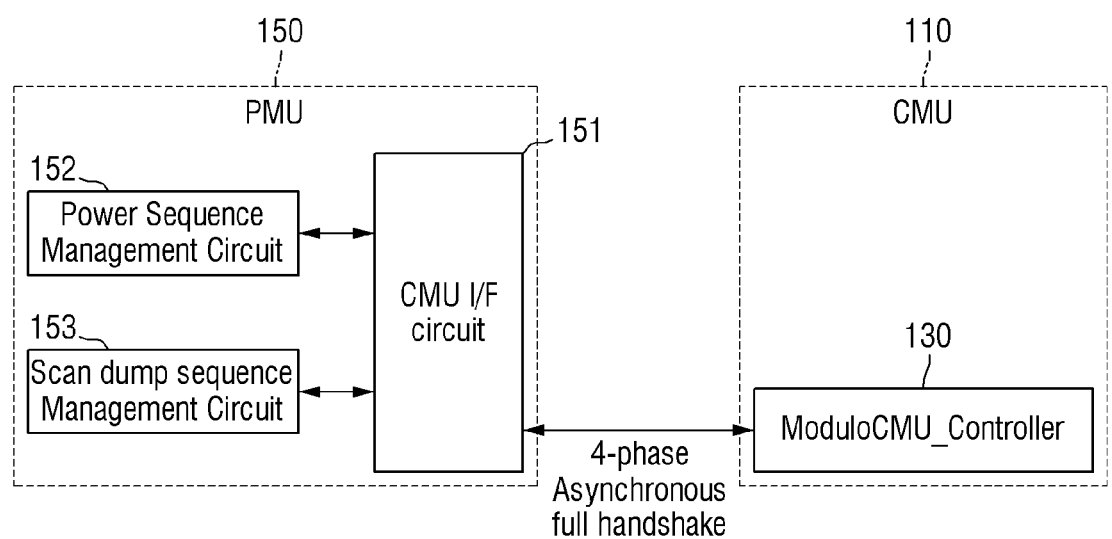
FIG. 34 is a block diagram of a power management unit (PMU) included in a semiconductor device according to an exemplary embodiment of the present inventive concept.

FIG. 34 is a block diagram of an embodiment of the PMU 300 illustrated in FIG. 1 according to an exemplary embodiment of the present inventive concept. FIGS. 35 through 39 are timing diagrams illustrating examples of a clock on/off operation of the PMU 150.

Referring to FIG. 34, the PMU 300 may communicate with a CMU 100 through a CMU interface circuit (CMU I/F)

151 according to the full handshake method. In addition, the PMU 300 may further include a power sequence management circuit 152 and a scan dump sequence management circuit 153.

Figure 35:
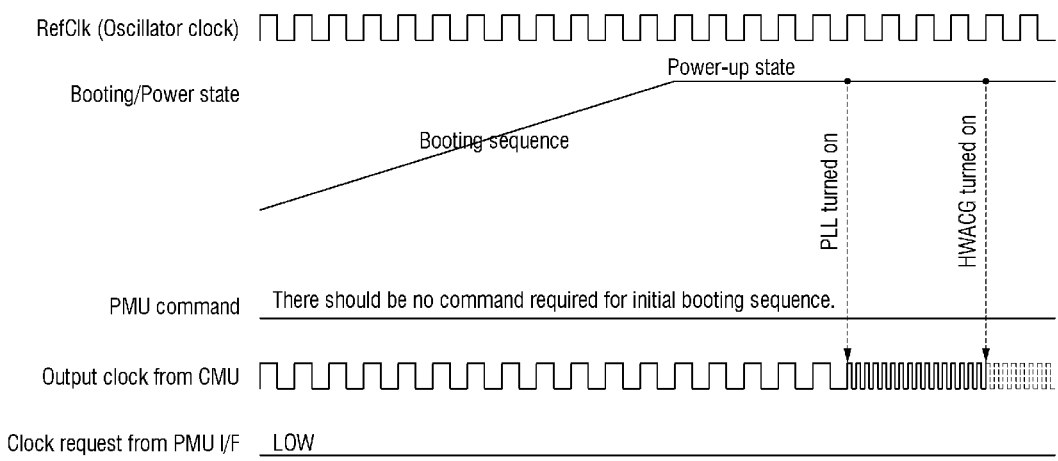
FIGS. 35 through 39 are timing diagrams illustrating examples of a clock on/off operation of the PMU.
Figure 36:
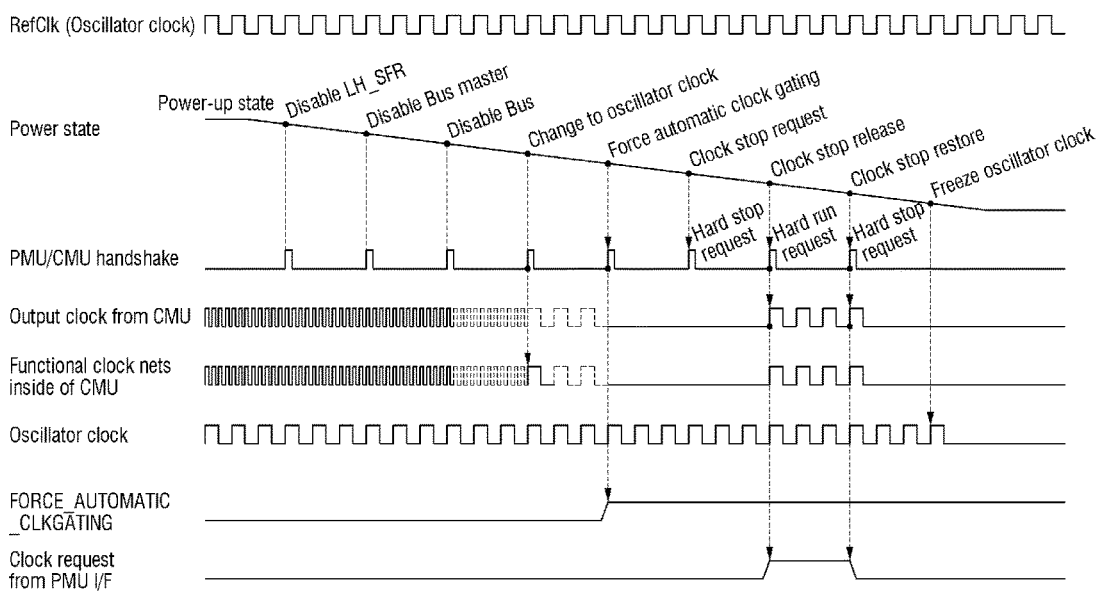
Figure 37:
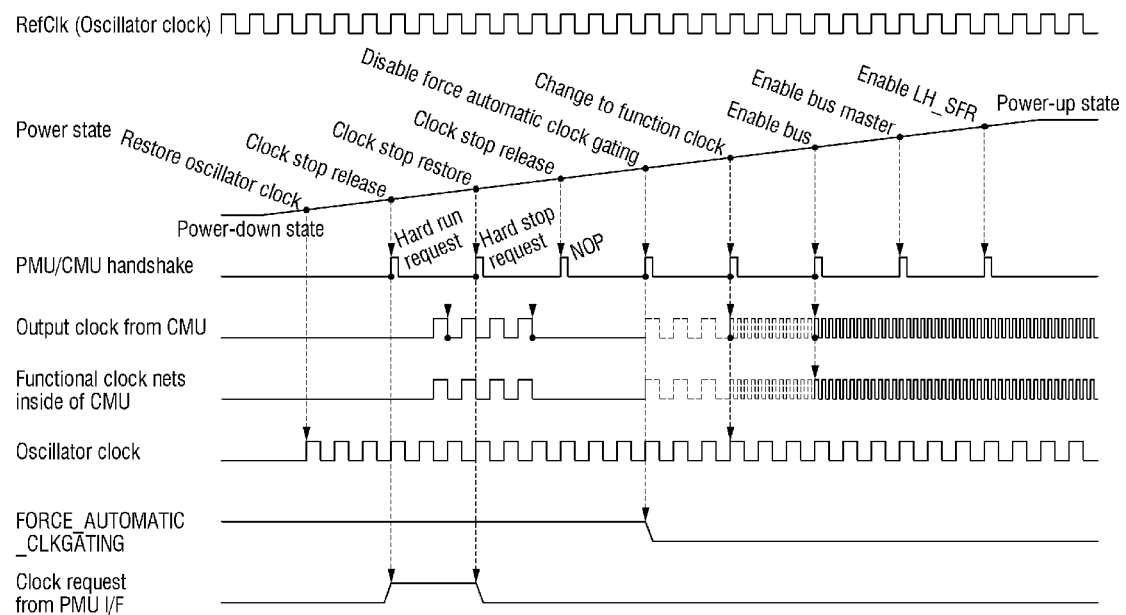
Figure 38:
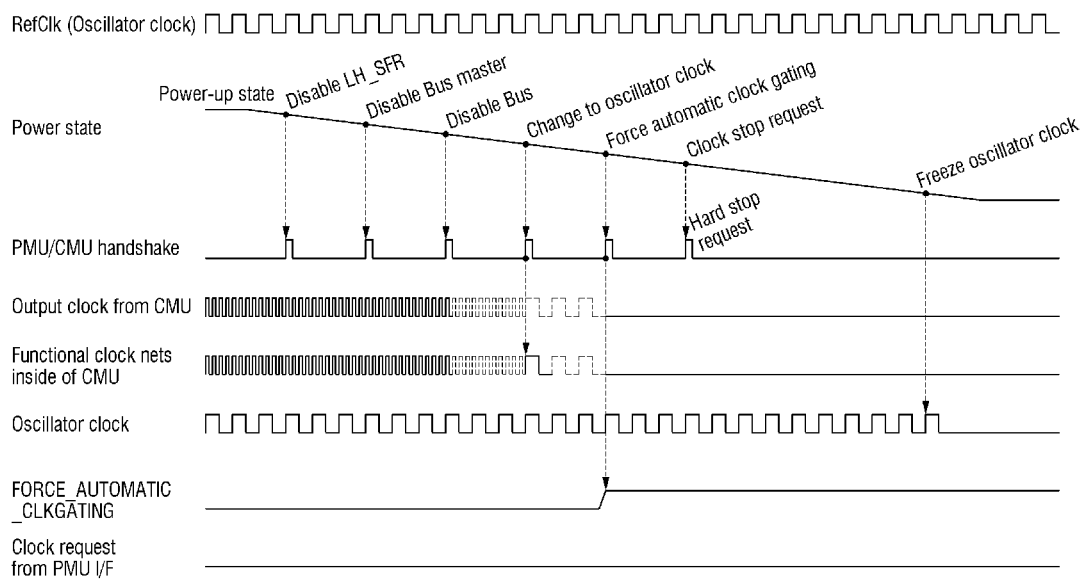
Figure 39:
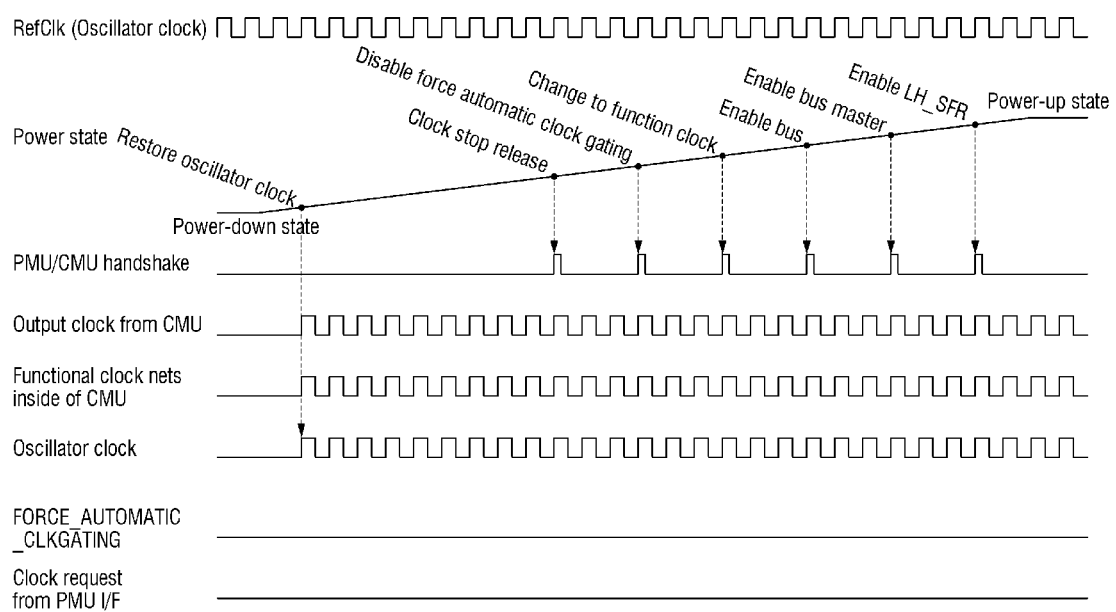

FIG. 35 illustrates the operation of the PMU 300 in a booting sequence, FIG. 36 illustrates the operation of the PMU 300 in a power-down sequence for w/retention of the CMU 100, FIG. 37 illustrates the operation of the PMU 300 in a power-up sequence for w/ retention of the CMU 100, FIG. 38 illustrates the operation of the PMU 300 in a power-down sequence for w/o retention of the CMU 100, and FIG. 39 illustrates the operation of the PMU 300 in a power-up sequence for w/o retention of the CMU 100.

Referring to FIG. 35, in a power-up state following the booting sequence, a PLL operates. After the operation of the PLL, clock gating by hardware according to various embodiments is performed, if necessary, in an environment for minimizing unnecessary power consumption.

Referring to FIG. 36 and FIG. 1, the power-down sequence is as follows.

First, a bus transaction between the CMU 100 and IP blocks 200 through 220 is terminated, and the provision of clock signals CLK1 through CLK3 by the CMU 100 is stopped. Then, the use of the PLL is stopped by switching use of the PLL to an oscillator, and the CMU 100 obtains the control over a clock source on which clock gating by the hardware has not been performed. After a retention operation, the oscillator is stopped. The CMU 100 may temporarily generate clock signals for the retention operation.

Referring to FIG. 37, the power-up sequence is as follows.

First, the oscillator is operated to perform a retention operation. For the retention operation, the CMU 100 may temporarily generate a clock signal. Next, the control over the clock source on which clock gating by the hardware has not been performed is removed, and the PLL is operated. Then, the bus transaction between the CMU 100 and the IP blocks 200 through 220 is prepared to be performed. Accordingly, the power-up sequence is completed.

Referring to FIG. 38, the power-down sequence is as follows.

First, the bus transaction between the CMU 100 and the IP blocks 200 through 220 is terminated, and the provision of clock signals by the CMU 100 is stopped. Next, the use of the PLL is stopped by switching from use of the PLL to use of the oscillator, and the CMU 100 obtains the control over the clock source on which clock gating by hardware has not been performed. Then, the oscillator is stopped.

Referring to FIG. 39, the power-up sequence is as follows.

First, the oscillator is operated, the control over the clock source on which clock gating by the hardware has not been performed is removed, and the PLL is operated. Then, the bus transaction between the CMU 100 and the IP blocks 200 through 220 is prepared to be performed. Accordingly, the power-up sequence is completed.

Figure 40:
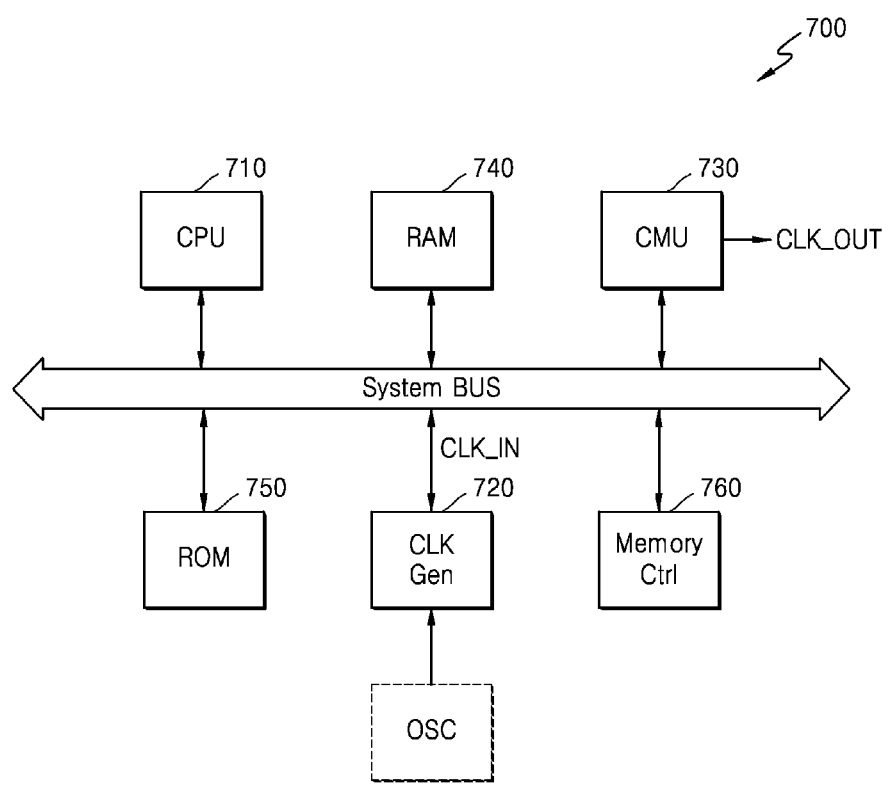
FIG. 40 is a block diagram of a semiconductor device according to an exemplary embodiment of the present inventive concept.

FIG. 40 is a block diagram of a semiconductor device according to an exemplary embodiment of the present inventive concept.

Referring to FIG. 40, the semiconductor device 700 includes a central processing unit (CPU) 710, a clock generator 720, a CMU 730, a random access memory (RAM) 740, a read only memory (ROM) 750, and a memory control unit 760. An oscillator OSC may be provided outside the semiconductor device 700 to provide an oscillation signal. The CMU 730 may be replaced with the CMU 100 of FIG. 1. However, this is merely an embodiment, and the semiconductor device 700 according to the embodiments can include various other functional blocks. In addition, the oscillator OSC can also be included in the semiconductor device 700. The semiconductor device 700 of FIG. 40 may be included in a semiconductor system as an application processor.

The clock generator 720 generates a reference clock signal CLK_IN having a reference frequency using a signal from the oscillator OSC. The CMU 730 may receive the reference clock signal CLK_IN, generate an operation clock signal CLK_OUT having a certain frequency, and provide the operation clock signal CLK_OUT to each functional block. The CMU 730 may include one or more master clock controllers and one or more slave clock controllers. Each of the clock controllers may generate the operation clock signal CLK_OUT using the reference clock signal CLK_IN.

In addition, since the clock controllers included in the CMU 730 are connected by channels, the management of clock signals can be performed hardware-wise. Also, since the clock controllers included in the CMU 730 are connected to the functional blocks by channels, a clock request and an acknowledgement can be performed hardware-wise.

The CPU 710 may process or execute codes and/or data stored in the RAM 740. For example, the CPU 710 may process or execute the codes and/or the data in response to an operation clock signal output from the CMU 730. The CPU 710 may be implemented as a multi-core processor. The multi-core processor is one computing component having two or more independent and substantial processors, and each of the processors may read and execute program instructions. Since the multi-core processor can simultaneously run a plurality of accelerators, a data processing system including the multi-core processor can perform multi-acceleration.

The RAM 740 may temporarily store program codes, data, or instructions. For example, program codes and/or data stored in an internal or external memory (not illustrated) may be temporarily stored in the RAM 740 under the control of the CPU 710 or according to booting code stored in the ROM 750. The memory control module 760 is a block for interfacing with the internal or external memory. The memory control module 760 controls the overall operation of the memory and controls data exchange between a host and the memory.

While the present inventive concept has been particularly shown and described with reference to exemplary embodiments thereof, it will be understood by those of ordinary skill in the art that various changes in form and detail may be made therein without departing from the spirit and scope of the present inventive concept.

What is claimed is:

1. A system on chip (SoC) comprising: a plurality of intellectual property (IP) blocks; and a clock management unit (CMU) performing clock gating on at least one of the IP blocks, one of the IP blocks providing a request signal to the CMU indicating the one of IP blocks desires to enter a selected one of a sleep mode and an active mode, wherein the IP blocks and the CMU interface with one another using a full handshake method, wherein the CMU outputs a clock signal and acknowledgement signal (ACK) to the one of the IP-blocks in response to the request signal indicating the one of the IP blocks desires to enter the active mode, and activates the Ack signal upon determining the output clock signal is stable.

2. The SoC of claim 1, wherein the one of the IP blocks enters the selected mode in response to the acknowledgement signal.

3. The SoC of claim 1, wherein the CMU deactivates the acknowledgement signal to indicate the CMU has stopped outputting the output clock signal in response to the request signal indicating the one of the IP blocks desires to enter the sleep mode, and then stops providing the output clock signal to the one IP block.

4. The SoC of claim 1, further comprising a power management unit cutting off power to the CMU when no request signals have been sent by the IP blocks during a given period.

5. The SoC of claim 1, wherein the CMU comprises a controller receiving a first signal from a crystal oscillator and a second signal from a phase locked loop (PLL), and providing one of the received signals as the output clock signal and the acknowledgement signal in response to the request signal.

6. The SoC of claim 1, wherein the CMU comprises:
a multiplexer receiving an internal clock signal and an external clock signal, and providing one of the received clock signals as the output clock signal; and
a controller providing the acknowledgement signal in response to the request signal.

7. The SoC of claim 1, wherein the CMU comprises;
a frequency dividing circuit dividing an input clock signal to generate a divided clock signal, and providing the divided clock signal as the output clock signal; and
a controller providing the acknowledgement signal in response to the request signal.

8. The SoC of claim 1, wherein the CMU comprises:
a shortstop circuit performing an operation on an input clock signal to generate a resulting clock signal comprising a plurality of pulses during a first period and a constant level during a second period, and providing the resulting clock signal as the output clock signal; and
a controller providing the acknowledgement signal in response to the request signal.

9. The SoC of claim 1, wherein the CMU comprises:
a control circuit outputting a control signal and the acknowledgement signal in response to the request signal;
a clock source outputting the clock signal in response to the control signal.

10. The SoC of claim 1, wherein the CMU comprises:
a first clock component providing a first request signal indicating a first one of the IP blocks desires to enter one of a sleep mode and an active mode;
a second clock component providing a second request signal indicating a second one of the IP blocks desires to enter one of a sleep mode and an active mode; and
a third clock component to start providing a clock signal to both the first and second clock components when one of the request signals indicate a desire to enter the active mode, and stop providing the clock signal when both of the request signals indicate a desire to enter the sleep mode.

11. The SoC of claim 1, wherein the CMU comprises:
a clock component performing the clock gating:
a channel management (CM) circuit managing a channel connecting the CM circuit to the one of the IP blocks; and
a wire connecting the clock component to the CM circuit, wherein the request signal is sent across the wire from the CM circuit to the clock component, and wherein the Ack signal is sent across the wire from the clock component to the CM circuit.

12. A clock gating component comprising:
a clock control circuit generating an operating clock signal; and
a channel management (CM) circuit receiving a request signal across a communication channel from an external device, and forwarding the request signal to the clock control circuit,
wherein the clock control circuit transmits a clock request to a parent control circuit based on the request signal, receives a first acknowledgement (Ack) signal from the parent control circuit, selectively provides the operating clock signal to the external device according to the first Ack from the parent control circuit and provides a second acknowledgement (Ack) signal to the CM circuit indicating the clock control circuit has received the request signal,
wherein the clock control circuit provides the operating clock signal to the external device when the first Ack indicates the operating clock signal is stable.

13. The clock gating component of claim 12, wherein the clock control circuit provides the operating clock signal to the external device when the request signal indicates the external device requires the operating clock signal, and wherein the clock control circuit stops providing the operating clock signal to the external device when the request signal indicates the external device no longer requires the operating clock signal.

14. The clock gating component of claim 12, wherein the clock control circuit comprises:
a finite state machine (FSM) activating enable signal upon determining that the request signal indicates the external device requires the operating clock signal, and deactivating the enable signal upon determining that the request signal indicates the external device no longer requires the operating clock signal.

15. The clock gating component of claim 14, wherein the clock control circuit further comprises:
a clock gating circuit, wherein the clock gating circuit starts outputting the operating clock signal to the external device in response to the activated enable signal, and outputs a feedback signal to the FSM indicating that output of the operating clock signal has started, and wherein the clock gate circuit stops outputting the operating clock signal to the external device in response to the deactivated enable signal.

16. The clock gating component of claim 14, wherein the FSM is operated using a reference clock signal of a different clock domain than the operating clock signal.

17. A clock multiplexer (MUX) component comprising:
a clock control circuit selecting one of a first clock signal and a second clock signal based on a first selection signal, and generating an operating clock signal based on the selected clock signal; and
a channel management (CM) circuit receiving a request signal across a communication channel from an external device, and forwarding the request signal to the clock control circuit,
wherein the clock control circuit transmits a clock request to a parent control circuit based on the request signal, receives a first acknowledgement (Ack) signal from the parent control circuit, selectively outputs the operating clock signal in response to the first Ack signal, and outputs a second acknowledgement (Ack) signal to the CM circuit indicating the clock control circuit has received the request signal, and wherein the clock control circuit outputs the operating clock signal when the first Ack indicates the operating clock signal is stable.

18. The clock MUX component of claim 17, wherein the clock control circuit includes a finite state machine (FSM) configured to output the request signal to a first clock source providing the first clock signal and a second clock source providing the second clock signal.

19. The clock MUX component of claim 18 further comprising a selection circuit receiving the first clock signal and the second clock signal, outputting one of the two clock signals in response to a second selection signal output from the FSM, and outputting a status signal to the FSM after outputting the one clock signal.

20. The clock MUX component of claim 19, wherein the selection circuit is operating using a reference clock signal of a different clock domain than the operating clock signal.

21. The clock MUX component of claim 17, wherein the first clock signal is received from a crystal oscillator and the second clock signal is received from a phase locked loop (PLL).

22. A clock dividing component comprising:
a clock control circuit performing a dividing operation on an input clock signal to generate a divided clock signal, and generating an operating clock signal based on the divided clock signal; and
a channel management (CM) circuit receiving a request signal across a communication channel from an external device, and forwarding the request signal to the clock control circuit,
wherein the clock control circuit transmits a clock request to a parent control circuit based on the request signal, receives a first acknowledgement (Ack) signal from the parent control circuit, selectively outputs the operating clock signal in response to the first Ack signal, and outputs a second acknowledgement (Ack) signal to the CM circuit indicating the clock control circuit has received the request signal, and
wherein the clock control circuit outputs the operating clock signal when the first Ack indicates the operating clock signal is stable.

23. The clock dividing component of claim 22, wherein the clock control circuit comprises:
a clock dividing circuit; and
a finite state machine (FSM) determining a dividing ratio, and outputting the dividing ratio to the clock dividing circuit in response to the request signal,
wherein the clock dividing circuit divides the input clock signal in response to the dividing ratio using the dividing ratio.

24. A method of operating a clock management unit (CMU), the method comprising:
the CMU determining whether a request signal received from an intellectual property (IP) block indicates the IP block desires to enter a selected one of an active mode and a sleep mode;
the CMU outputting an acknowledgement (Ack) signal and a clock signal to the IP block when the request signal indicates the IP block desires to enter the active mode;
the CM setting the Ack signal to an activated level upon determining the output clock signal is stable; and
the CMU setting the Ack signal to a deactivated level when the clock request signal indicates the IP block desires to enter the sleep mode.

25. The method of claim 24, wherein the request signal is activated when the IP block desires to enter the active mode and is deactivated when the IP block desires to enter the sleep mode.

* * * * *